US012569902B2

(12) United States Patent
     Hagiwara et al.

(10) Patent No.:  US 12,569,902 B2
(45) Date of Patent:      Mar. 10, 2026

(54) METHOD OF MANUFACTURING STAKING ASSEMBLY, METHOD OF MANUFACTURING HUB UNIT BEARING, STAKING DEVICE, STAKING ASSEMBLY, AND METHOD OF MANUFACTURING VEHICLE

(71) Applicant: NSK LTD., Tokyo (JP)

(72) Inventors: Nobuyuki Hagiwara, Fujisawa (JP); Xuexiao Zhao, Fujisawa (JP)

(73) Assignee: NSK LTD., Tokyo (JP)

( * ) Notice:    Subject to any disclaimer, the term of this patent is extended or adjusted under 35 U.S.C. 154(b) by 0 days.

(21) Appl. No.: 18/952,499

(22) Filed:    Nov. 19, 2024

(65)            Prior Publication Data

US 2025/0073772 A1      Mar. 6, 2025

Related U.S. Application Data

(62) Division of application No. 17/599,712, filed as application No. PCT/JP2020/015920 on Apr. 9, 2020, now Pat. No. 12,179,251.

(30)        Foreign Application Priority Data

Apr. 10, 2019    (JP) ................................. 2019-074550
Aug. 30, 2019    (JP) ................................. 2019-157605
Feb. 20, 2020    (WO) .................. PCT/JP2020/006675

(51) Int. Cl.
     B21D 39/03        (2006.01)
     B21J 9/02          (2006.01)
                          (Continued)
(52) U.S. Cl.
     CPC ............... B21D 39/03 (2013.01); B21J 9/06 (2013.01); B21K 1/05 (2013.01); B21J 9/025 (2013.01);
                          (Continued)

(58) Field of Classification Search
     CPC .... B21J 9/025; B21J 9/06; B21K 1/40; B21K 1/05; B60B 2310/208; B60B 2310/3142;
                          (Continued)

(56)            References Cited

U.S. PATENT DOCUMENTS 4,671,092  A      6/1987  Fomichev et al.
   10,065,235  B2     9/2018  Zieve et al.
                          (Continued)

FOREIGN PATENT DOCUMENTS

CN        108714676  A    10/2018
EP        0 854 303  A2     7/1998
                          (Continued)

OTHER PUBLICATIONS

Extended European Search Report dated Dec. 5, 2022 from the European Patent Office in EP Application No. 20787498.3.
                          (Continued)

*Primary Examiner* — Christopher J. Besler
(74) *Attorney, Agent, or Firm* — Sughrue Mion, PLLC

(57)            ABSTRACT

An application position of a processing force directed radially outward is continuously changed in the circumferential direction of a cylindrical portion (25) while applying the processing force to a part of the cylindrical portion (25) of a hub main body (21) in the circumferential direction. An application position of a processing force directed radially inward is continuously changed in the circumferential direction of a staking portion intermediary body (41) while applying the processing force to a part of the staking portion intermediary body (41) in the circumferential direction.

4 Claims, 13 Drawing Sheets

(51) Int. Cl.
  B21J 9/06     (2006.01)
  B21K 1/05     (2006.01)
  F16C 35/063   (2006.01)
  F16C 43/04    (2006.01)
  *F16C 19/18*      (2006.01)

(52) U.S. Cl.
  CPC ............ *F16C 19/18* (2013.01); *F16C 35/063* (2013.01); *F16C 43/04* (2013.01)

(58) Field of Classification Search
  CPC . B60B 2310/314; B21D 39/03; F16C 35/063; F16C 43/086
  See application file for complete search history.

(56) References Cited

U.S. PATENT DOCUMENTS

| | | | |
|---|---|---|---|
| 2002/0062564 | A1 | 5/2002 | Hagiwara et al. |
| 2007/0227004 | A1 | 10/2007 | Tsuzaki et al. |
| 2016/0263940 | A1 | 9/2016 | Hagiwara |
| 2018/0243818 | A1 | 8/2018 | Hagiwara et al. |
| 2018/0257129 | A1 | 9/2018 | Kikuchi et al. |
| 2020/0009642 | A1 | 1/2020 | Maruno et al. |

FOREIGN PATENT DOCUMENTS

| | | |
|---|---|---|
| FR | 382249 A | 2/1908 |
| JP | 10-196661 A | 7/1998 |
| JP | 2001-162338 A | 6/2001 |
| JP | 2002-225503 A | 8/2002 |
| JP | 2003-275832 A | 9/2003 |
| JP | 2005-195084 A | 7/2005 |
| JP | 2007-271045 A | 10/2007 |
| JP | 2015-077616 A | 4/2015 |
| JP | 2017-013079 A | 1/2017 |
| JP | 2017-018991 A | 1/2017 |
| JP | 2017-067254 A | 4/2017 |
| JP | 2017-106510 A | 6/2017 |
| JP | 6332572 B1 | 5/2018 |
| WO | 2018/012450 A1 | 1/2018 |
| WO | 2018/159670 A1 | 9/2018 |

OTHER PUBLICATIONS

International Search Report for PCT/JP2020/006675 dated Apr. 28, 2020 (PCT/ISA/210).
International Search Report for PCT/JP2020/015920 dated Jul. 14, 2020 (PCT/ISA/210).
Japanese Office Action issued Feb. 27, 2024 in Application No. 2021-133776.
Office Action dated Dec. 12, 2022 from the United States Patent and Trademark Office in U.S. Appl. No. 17/427,397.
Partial Supplementary European Search Report issued Aug. 26, 2022 in European Application No. 20787357.1.
Written Opinion of the International Searching Authority dated Apr. 28, 2020 for International Application No. PCT/JP2020/006675.
Written Opinion of the International Searching Authority dated Jul. 14, 2020 for International Application No. PCT/JP/2020/015920.

(OTHER SIDE IN AXIAL DIRECTION)
OUTSIDE IN AXIAL DIRECTION
←

(ONE SIDE IN AXIAL DIRECTION)
INSIDE IN AXIAL DIRECTION
→

(ONE SIDE IN AXIAL DIRECTION) INSIDE IN AXIAL DIRECTION

OUTSIDE IN AXIAL DIRECTION (OTHER SIDE IN AXIAL DIRECTION)

BEFORE DISPLACEMENT

AFTER DISPLACEMENT (ONE SIDE IN AXIAL DIRECTION)
INSIDE IN AXIAL DIRECTION

OUTSIDE IN
AXIAL DIRECTION
(OTHER SIDE IN
AXIAL DIRECTION)

(ONE SIDE IN
AXIAL DIRECTION)
INSIDE IN
AXIAL DIRECTION

OUTSIDE IN
AXIAL DIRECTION
(OTHER SIDE IN
AXIAL DIRECTION)

200

201

152
154    151
153A
(153)

202

(OTHER SIDE IN AXIAL DIRECTION)
OUTSIDE IN AXIAL DIRECTION
←

(ONE SIDE IN AXIAL DIRECTION)
INSIDE IN AXIAL DIRECTION
→

(ONE SIDE IN
AXIAL DIRECTION)
INSIDE IN
AXIAL DIRECTION

OUTSIDE IN
AXIAL DIRECTION
(OTHER SIDE IN
AXIAL DIRECTION)

METHOD OF MANUFACTURING STAKING ASSEMBLY, METHOD OF MANUFACTURING HUB UNIT BEARING, STAKING DEVICE, STAKING ASSEMBLY, AND METHOD OF MANUFACTURING VEHICLE

The present invention relates to a staking assembly, a method of manufacturing a hub unit bearing, a staking device, and a method of manufacturing a vehicle.

This application is a divisional of U.S. application Ser. No. 17/599,712, filed Sep. 29, 2021, which is a National Stage of International Application No. PCT/JP2020/015920 filed Apr. 9, 2020, claiming priorities based on Japanese Patent Application No. 2019-074550 filed on Apr. 10, 2019, Japanese Patent Application No. 2019-157605 filed on Aug. 30, 2019, and International Application No. PCT/JP2020/006675 filed on Feb. 20, 2020 and the contents are incorporated herein by reference.

TECHNICAL FIELD

Background Art

A hub unit bearing is known as an example of a staking assembly in which a first member and a second member are combined in the axial direction. Vehicle wheels and braking rotating bodies are rotatably supported to suspension devices by the hub unit bearings. FIG. 13 shows an example of a conventional hub unit bearing. A hub unit bearing 100 rotatably supports a hub 102 on the inner radial side of an outer race 101 through a plurality of rolling elements 103a and 103b.

Regarding the hub unit bearing 100, the outside in the axial direction is the left side of FIG. 13 which is the outside in the width direction of the vehicle body while the hub unit bearing 100 is assembled to the automobile. The inside in the axial direction is the right side of FIG. 11 which is the center side in the width direction of the vehicle body while the hub unit bearing 1 is assembled to the automobile. In the example of FIG. 13, regarding the hub unit bearing 100, the inside in the axial direction corresponds to one side in the axial direction and the outside in the axial direction corresponds to the other side in the axial direction.

The outer race 101 includes double-row outer race tracks 104a and 104b provided on an inner peripheral surface and includes a stationary flange 105 which is provided in an axially intermediate portion to support and fix the outer race 101 to a knuckle of a suspension device. The hub 102 includes double-row inner race tracks 106a and 106b provided on an outer peripheral surface and includes a rotary flange 107 provided in an axially outer portion to support and fix the vehicle wheel and the braking rotating body by the hub 102. The plurality of rolling elements 103a and 103b are arranged for each row between the double-row outer race tracks 104a and 104b and the double-row inner race tracks 106a and 106b. With such a configuration, the hub 102 is rotatably supported on the inner radial side of the outer race 101.

In the example of FIG. 13, the hub 102 has a combination of a hub main body (hub race) 108 corresponding to a first hub element (first member) and an internal inner race 109 corresponding to a second hub element (second member). The inner race track 106a on the inside in the axial direction in the double-row inner race tracks 106a and 106b is provided on the outer peripheral surface of the internal inner race 109. The inner race track 106b on the outside in the axial direction in the double-row inner race tracks 106a and 106b is provided on the outer peripheral surface of the axially intermediate portion of the hub main body 108. The rotary flange 107 is provided in the axially outer portion of the hub main body 108. The hub main body 108 includes a fitting surface portion 110 provided on the outer peripheral surface of the axially inner portion and includes a step surface 111 provided at the axially outer end portion of the fitting surface portion 110 to be directed axially inward. The internal inner race 109 is externally fitted to the fitting surface portion 110 while the axially outer end surface abuts against the step surface 111. In this state, a staking portion 113 is formed by plastically deforming a cylindrical portion 112, protruding axially inward from a portion to which the internal inner race 109 is externally fitted in the hub main body 108, axially outward. The axially inner end surface of the internal inner race 109 is suppressed by the staking portion 113. In this way, the axially inner end surface of the internal inner race 109 is suppressed by the staking portion 113 so that a preload is applied to the rolling elements 103a and 103b. Then, the rigidity required for the hub unit bearing 100 is ensured by the preload.

As a device for forming the staking portion 113 used when manufacturing the hub unit bearing 100, a staking device 114 including a pressing die (staking die) 115 shown in FIG. 14 is known (for example, see Japanese Unexamined Patent Application No. 2001-162338 (Patent Literature 1)). The pressing die 115 is supported to be rotatable about a rotation axis $\beta$ inclined by an angle $\theta$ with respect to a reference axis $\alpha$. The lower end portion of the pressing die 115 is provided with a processing surface portion 116. The processing surface portion 116 is formed by an inner surface of an annular concave portion centered on the rotation axis $\beta$.

When forming the staking portion 113, the pressing die 115 is rotationally driven about the reference axis $\alpha$ without rotating the hub main body 108 about the reference axis $\alpha$ while pressing a part of the processing surface portion 116 in the circumferential direction in the pressing die 115 against a part of the cylindrical portion 112 of the hub main body 108 in the circumferential direction in a state in which the center axis of the hub main body 108 is aligned to the reference axis $\alpha$. Then, the pressing die 115 is rotated about the rotation axis $\beta$ based on a frictional force acting on the contact portion between the processing surface portion 116 and the cylindrical portion 112 in accordance with this operation. Accordingly, an application position of a processing force directed downward in the up and down direction (axially outward) and radially outward is continuously changed in the circumferential direction of the cylindrical portion 112 while applying the processing force from a part of the processing surface portion 116 of the pressing die 115 in the circumferential direction to a part of the cylindrical portion 112 in the circumferential direction. Accordingly, the staking portion 113 is formed by plastically deforming the cylindrical portion 112 to be expanded radially outward while axially crushing the cylindrical portion.

CITATION LIST

Patent Literature

[Patent Literature 1]
Japanese Patent Application, Publication No. 2001-162338

SUMMARY OF INVENTION

Technical Problem

In the conventional method of manufacturing the hub unit bearing 100, there is room for improvement in terms of improving the quality of the hub unit bearing 100. This point will be described below. That is, in the method of manufacturing the conventional hub unit bearing 100, the processing force directed downward in the up and down direction and radially outward is applied from the processing surface portion 116 of the pressing die 115 to the cylindrical portion 112 from the start to the end of processing for forming the staking portion 113. Therefore, at the final stage of processing for forming the staking portion 113, the thick portion of the axially inner end portion of the hub main body 108 flows radially outward along the axially inner surface of the internal inner race 109 as indicated by an arrow Xo in FIG. 12. Then, when such a thick portion flows, a force is applied to the axially inner surface of the internal inner race 109 in the diameter expansion direction and the internal inner race 109 expands in the diameter expansion direction.

In the manufacturing of the hub unit bearing 100, it is desired to prevent or suppress (control the outer shape) the expansion of the internal inner race 109 in the diameter expansion direction in accordance with the above-described processing of the staking portion 113. The outer shape control of the inner race 109 is advantageous for preventing the breakage of the internal inner race 109, suppressing a variation in preload, or decreasing the rotational friction of the hub 102 with respect to the outer race 101 due to the formation of the staking portion 113. Additionally, the same also applies to the other staking assembly in which the first member and the second member are combined in the axial direction.

An object of the present invention is to provide a method of manufacturing a staking assembly, a method of manufacturing a hub unit bearing, a staking device, a staking assembly, and a method of manufacturing a vehicle which are advantageous for improving quality.

Solution to Problem

In an aspect of the present invention, a method of manufacturing a staking assembly includes the steps of: axially combining a first member with a second member having a hole into which the first member is inserted; and forming a staking portion which is a part of the first member deformed radially outward in the first member, the step of forking the staking portion including applying a load including a first load component directed radially inward to a radially outer portion of the first member.

In an aspect of the present invention, a hub unit bearing to be manufactured includes an outer race having double-row outer race tracks provided on an inner peripheral surface, a hub having double-row inner race tracks provided on an outer peripheral surface, and a plurality of rolling elements arranged for each row between the double-row inner race tracks and the double-row outer race tracks.

The hub includes a first hub element and a second hub element in which an inner race track on one side in the axial direction in the double-row inner race tracks is provided on an outer peripheral surface.

The second hub element is externally fitted to the first hub element and suppresses a side surface on one side in the axial direction by a staking portion provided at one axial end portion of the first hub element.

As a configuration of the hub unit bearing to be manufactured in the present invention, it is possible to obtain a configuration in which the inner race track on the outside in the axial direction in the double-row inner race tracks is provided on the outer peripheral surface of the first hub element or a configuration in which the inner race track on the outside in the axial direction in the double-row inner race tracks is provided on the outer peripheral surface of the other hub element externally fitted to the first hub element.

In an aspect of the present invention, a method of manufacturing a hub unit bearing includes the steps of: axially combining the first hub element with the second hub element; and forming the staking portion in the first hub element. The staking portion forming step includes applying a load including a first load component directed radially inward to a radially outer portion of the first hub element.

For example, the staking portion forming step can include first and second steps below.

The first step is a step of forming a staking portion intermediary body by plastically deforming a cylindrical portion provided at one axial end portion of the first hub element before forming the staking portion to be expanded radially outward while axially crushing the cylindrical portion in such a manner that an application position of a processing force directed toward the other side in the axial direction and directed radially outward is continuously changed in the circumferential direction of the cylindrical portion while applying the processing force to a part of the cylindrical portion in the circumferential direction.

The second step is a step of forming the staking portion by plastically deforming the staking portion intermediary body to be pressed radially inward while axially crushing the staking portion intermediary body in such a manner that an application position of a processing force directed toward the other side in the axial direction and directed inward in the radial direction is continuously changed in the circumferential direction of the staking portion intermediary body while applying the processing force to a part of the staking portion intermediary body in the circumferential direction.

In an aspect of the present invention, in the manufacturing method, the first hub element and a pressing die are relatively rotated about a center axis of the first hub element while pressing a part of a processing surface portion in the circumferential direction in the pressing die including a rotation axis inclined with respect to the center axis of the first hub element and the processing surface portion formed by an inner surface of an annular concave portion centered on the rotation axis against a part of a processing object which is the cylindrical portion or the staking portion intermediary body in the circumferential direction in order to continuously change the application position of the processing force in the circumferential direction of the processing object while applying the processing force to the processing object.

For example, as a more specific aspect in this case, the following first to third aspects can be adopted.

In the first aspect, the pressing die is rotated about the rotation axis based on a frictional force acting on the contact portion between the processing surface portion and the processing object by rotationally driving the first hub element about the center axis of the first hub element without rotating the pressing die about the center axis of the first hub element while pressing a part of the processing surface portion in the circumferential direction in the pressing die against a part of the processing object in the circumferential direction.

In the second aspect, the first hub element is rotated about the center axis of the first hub element based on a frictional force acting on the contact portion between the processing surface portion and the processing object by rotationally driving the pressing die about the rotation axis without rotating the pressing die about the center axis of the first hub element while pressing a part of the processing surface portion in the circumferential direction in the pressing die against a part of the processing object in the circumferential direction.

In the third aspect, the pressing die is rotated about the rotation axis based on a frictional force acting on the contact portion between the processing surface portion and the processing object by rotationally driving the pressing die about the center axis of the first hub element without rotating the first hub element about the center axis of the first hub element while pressing a part of the processing surface portion in the circumferential direction in the pressing die against a part of the processing object in the circumferential direction.

In an aspect of the present invention, a position of the pressing die in the axial direction of the rotation axis in the second step may be disposed to be shifted toward the first hub element in relation to the position of the pressing die in the axial direction of the rotation axis in the first step.

In an aspect of the present invention, an inclination angle of the rotation axis with respect to the center axis of the first hub element in the second step may be set to be larger than an inclination angle of the rotation axis for the center axis of the first hub element in the first step.

In an aspect of the present invention, a time point of ending the first step may be determined by using a value of a torque for relatively rotating the first hub element and the pressing die about the center axis of the first hub element.

In an aspect of the present invention, the first step and the second step may be performed by using one staking device.

In an aspect of the present invention, the first step and the second step may be respectively performed by using different staking devices.

In this case, the pressing dies respectively provided in the staking device for performing the first step and the staking device for performing the second step may have the same shape and size.

In an aspect of the present invention, a staking device includes: a reference axis; a pressing die which includes a rotation axis inclined with respect to the reference axis and a processing surface portion formed by an inner surface of an annular concave portion centered on the rotation axis; and a mechanism which displaces the pressing die in the axial direction of the rotation axis.

In an aspect of the present invention, the staking device includes: a reference axis; a pressing die which includes a rotation axis inclined with respect to the reference axis and a processing surface portion formed by an inner surface of an annular concave portion centered on the rotation axis; and a mechanism which changes an inclination angle of the rotation axis with respect to the reference axis.

In an aspect of the present invention, the staking device may further include a mechanism which rotationally drives the first hub element about the reference axis while a center axis of the first hub element is aligned to the reference axis.

In an aspect of the present invention, the staking device may further include a mechanism which rotationally drives the pressing die about the rotation axis.

In an aspect of the present invention, a staking assembly includes: a first member; and a second member having a hole into which the first member is inserted and axially combined with the first member, wherein the first member includes a staking portion for the second member formed by deforming a shaft end of the first member radially outward, and wherein the staking portion includes a radially outer portion having a deformed portion at which a load was applied.

In an aspect of the present invention, a vehicle includes the hub unit bearing. In an aspect of the present invention, a method of manufacturing a vehicle manufactures the hub unit bearing by the method of manufacturing the hub unit bearing.

Advantageous Effects of Invention

According to the present invention, there are provided a method of manufacturing a staking assembly, a method of manufacturing a hub unit bearing, a staking device, a staking assembly, and a method of manufacturing a vehicle which are advantageous for improving quality.

Figure 2:
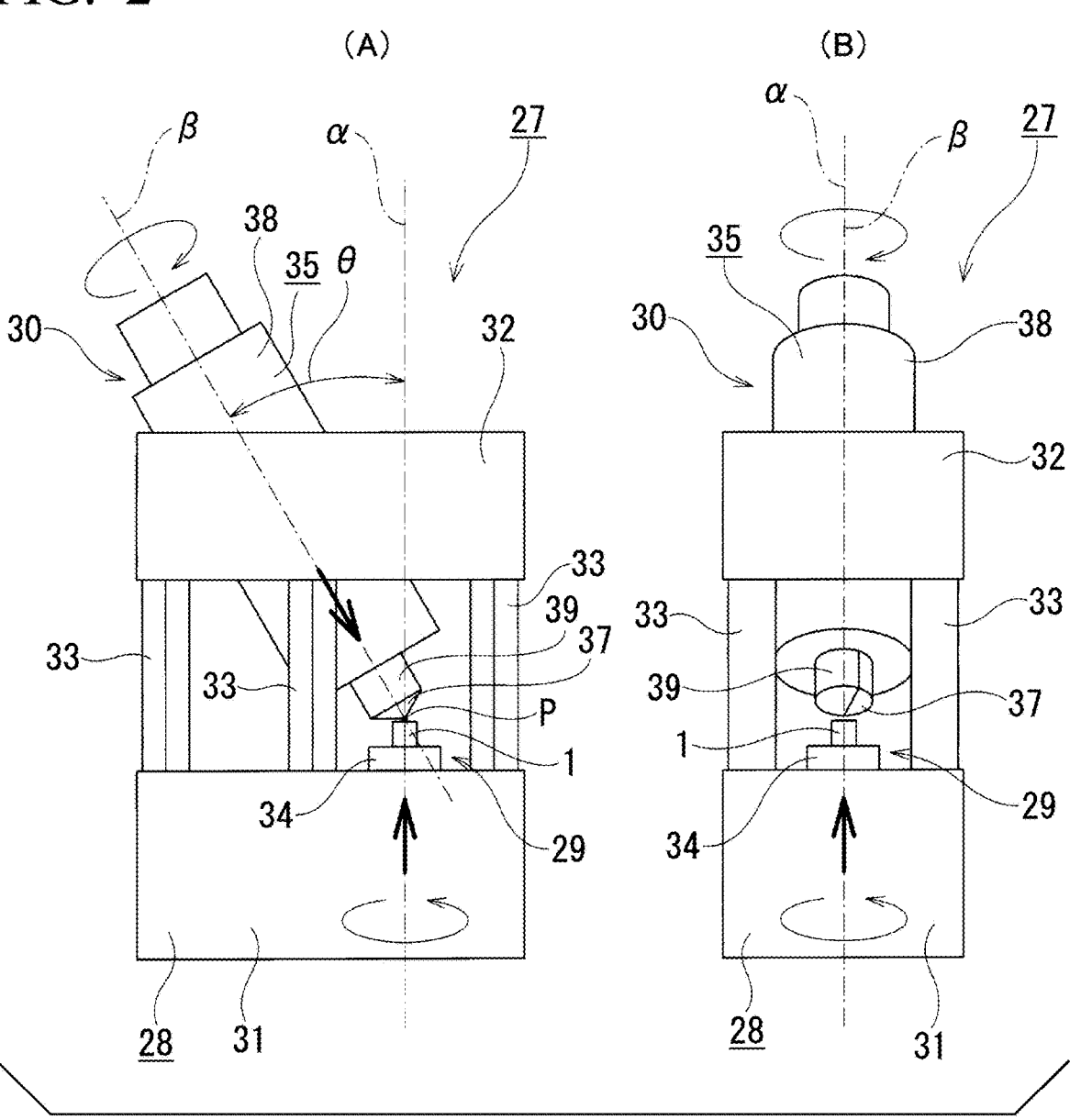

Part (A) of FIG. 2 is a front view of a staking device of an embodiment and part (B) of FIG. 2 is a view seen from the right side of part (A) of FIG. 2.

Figure 3:
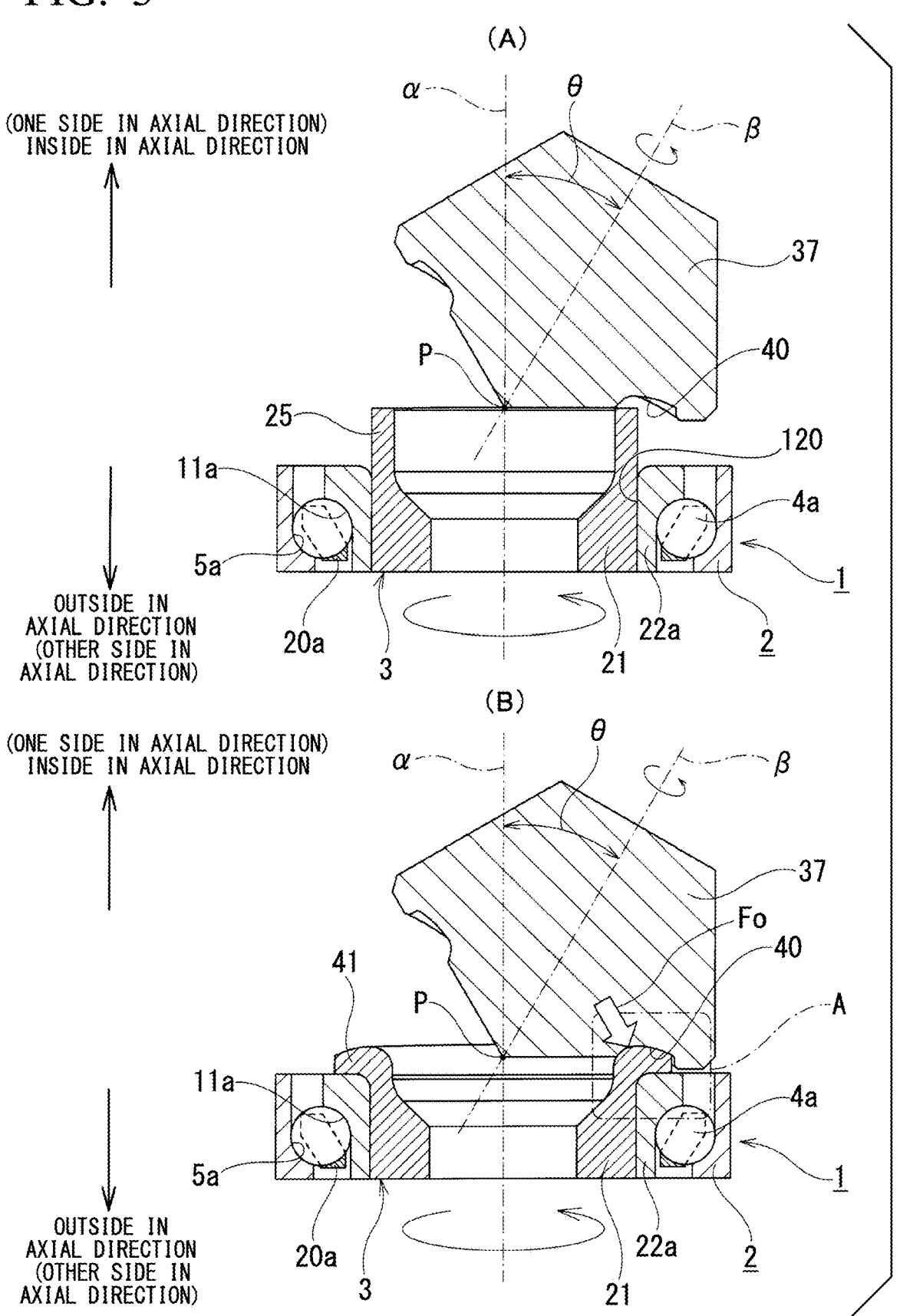

Part (A) of FIG. 3 is a partially cross-sectional view showing a state at the time of starting a step of forming a staking portion and part (B) of FIG. 3 is a partially cross-sectional view showing an intermediate stage of the step.

Figure 4:
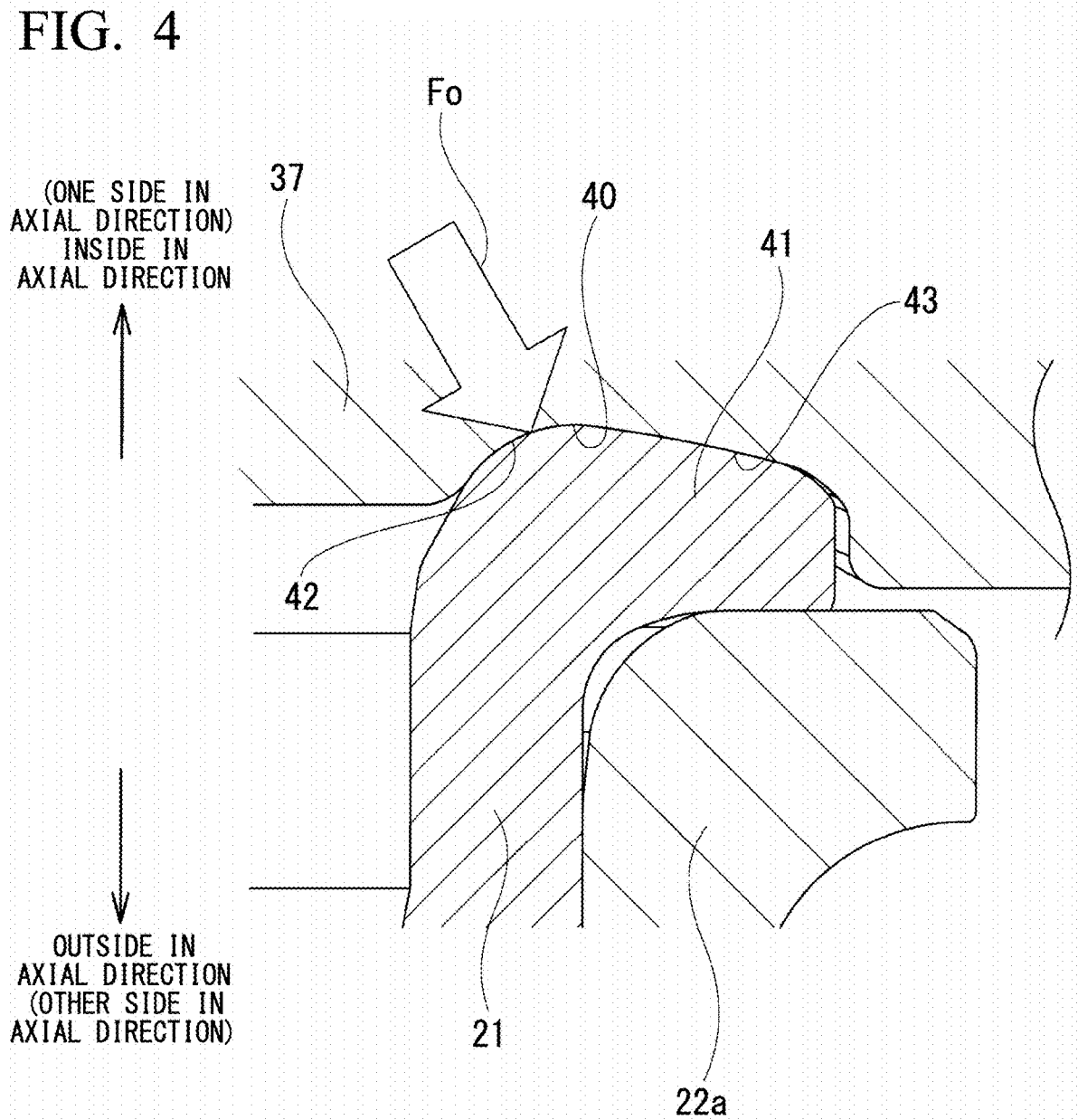

FIG. 4 is an enlarged view of an A part in FIG. 3(B).

Figure 5:
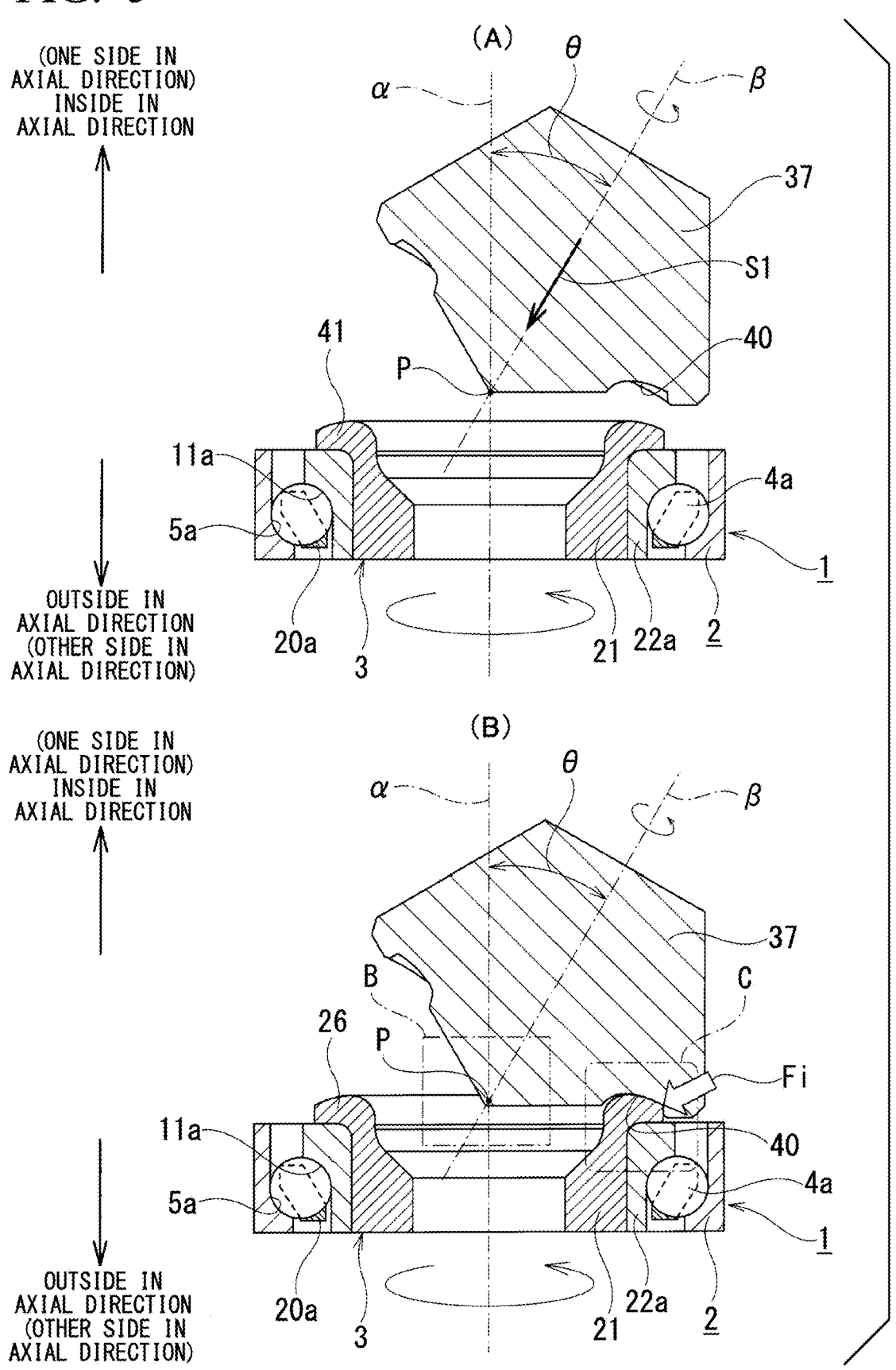

Part (A) of FIG. 5 is a partially cross-sectional view showing a stage in the middle of the step of forming the staking portion and a stage following part (B) of FIG. 3 and part (B) of FIG. 5 is a partially cross-sectional view showing a state at the time of ending the step.

Figure 6:
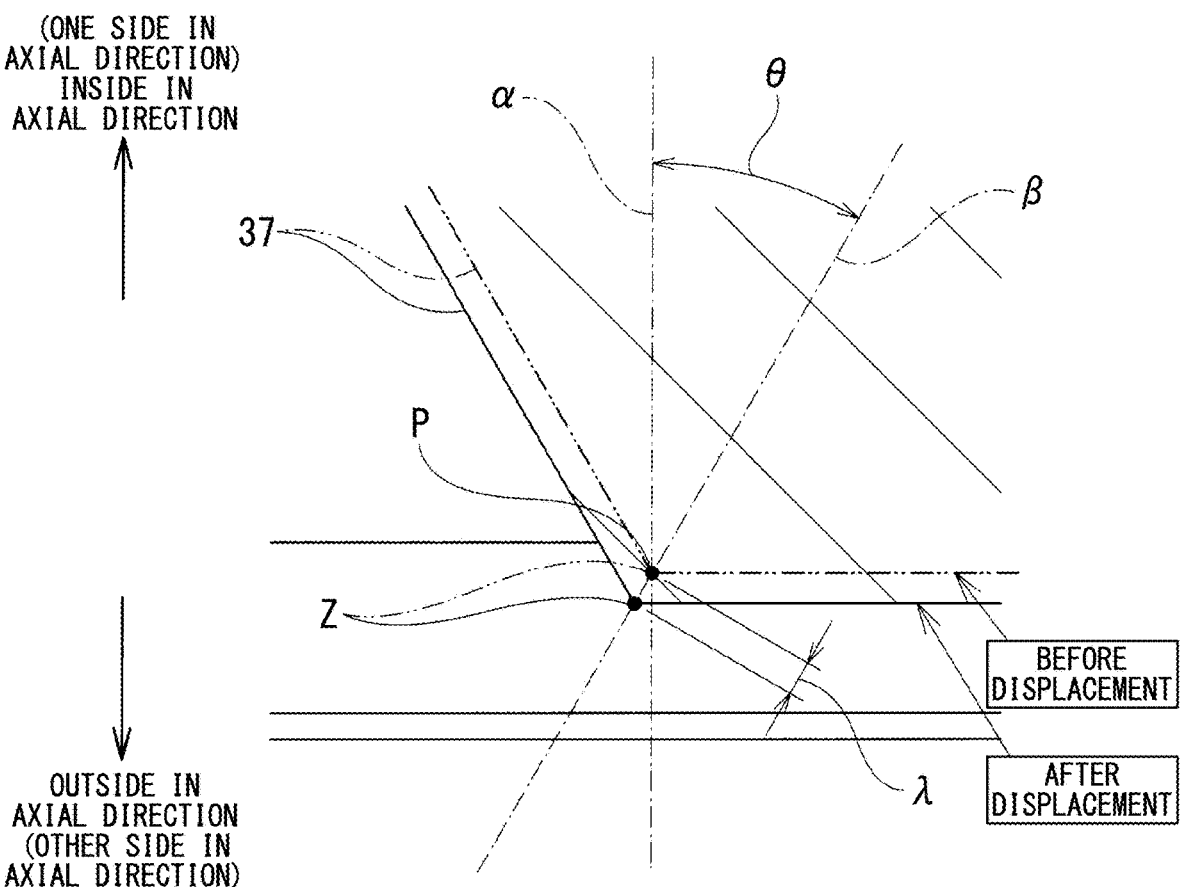

FIG. 6 is an enlarged view of a B part in FIG. 5(B).

Figure 7:
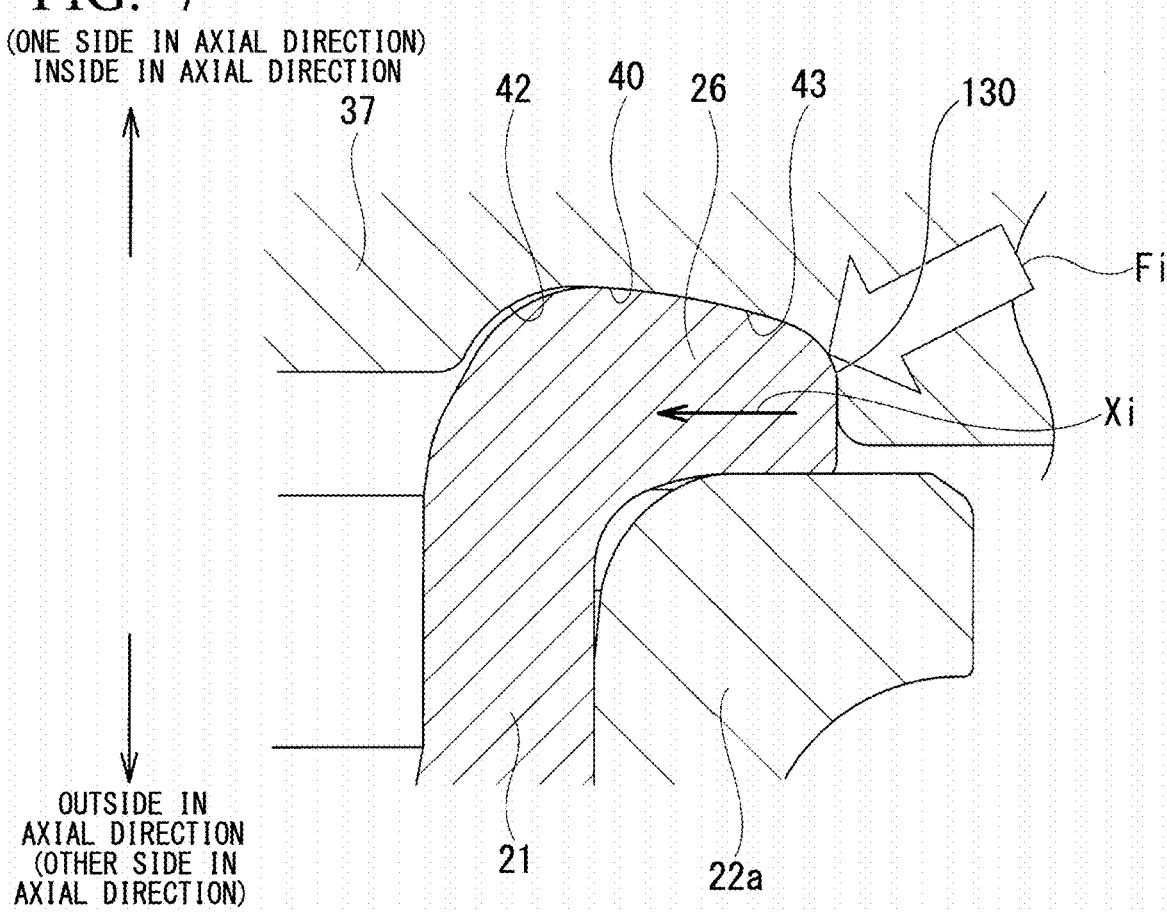

FIG. 7 is an enlarged view of a C part in FIG. 5(B).

Figure 8:
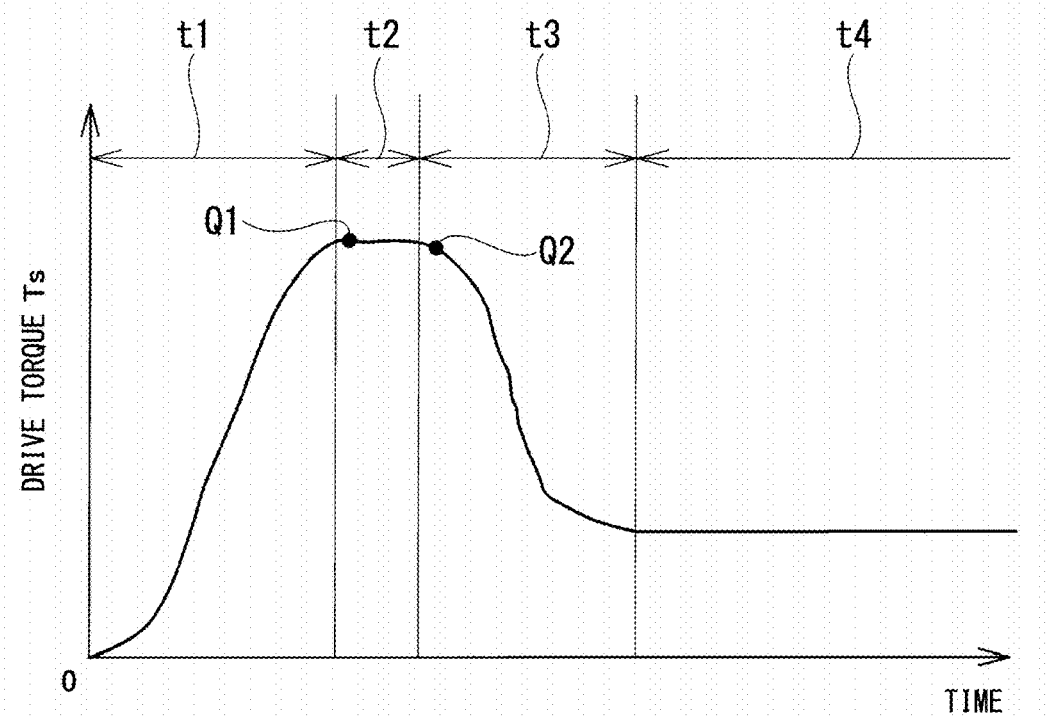

FIG. 8 is a diagram showing a time change of torque for relatively rotating a pressing die and a hub main body about a reference axis when forming the staking portion without changing the position of the pressing die in a rotation axis direction or the angles between the reference axis and the rotation axis on the way.

Figure 9:
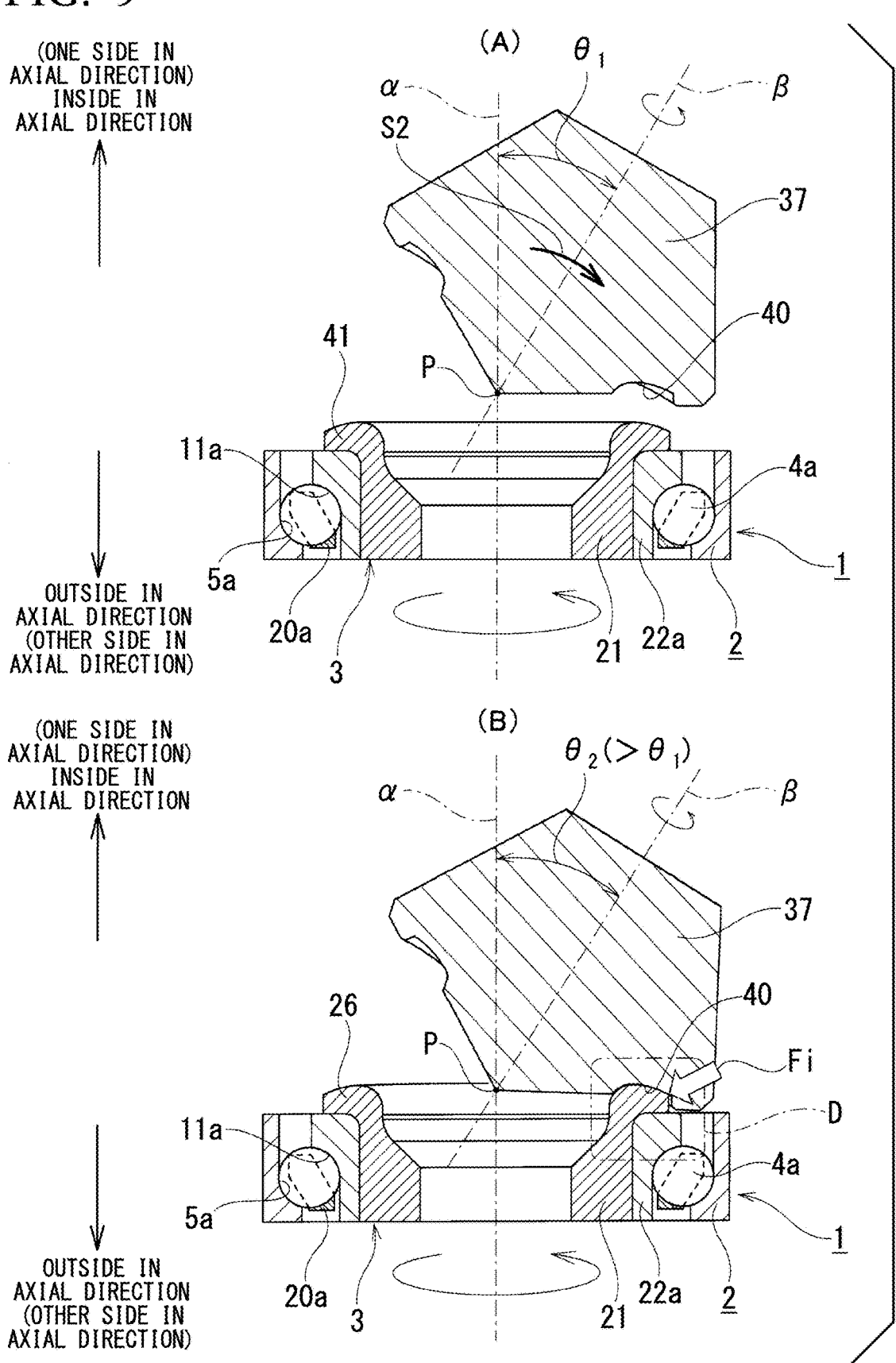

Part (A) and part (B) of FIG. 9 shows diagrams according to another embodiment similar to part (A) and (B) of FIG. 5.

Figure 10:
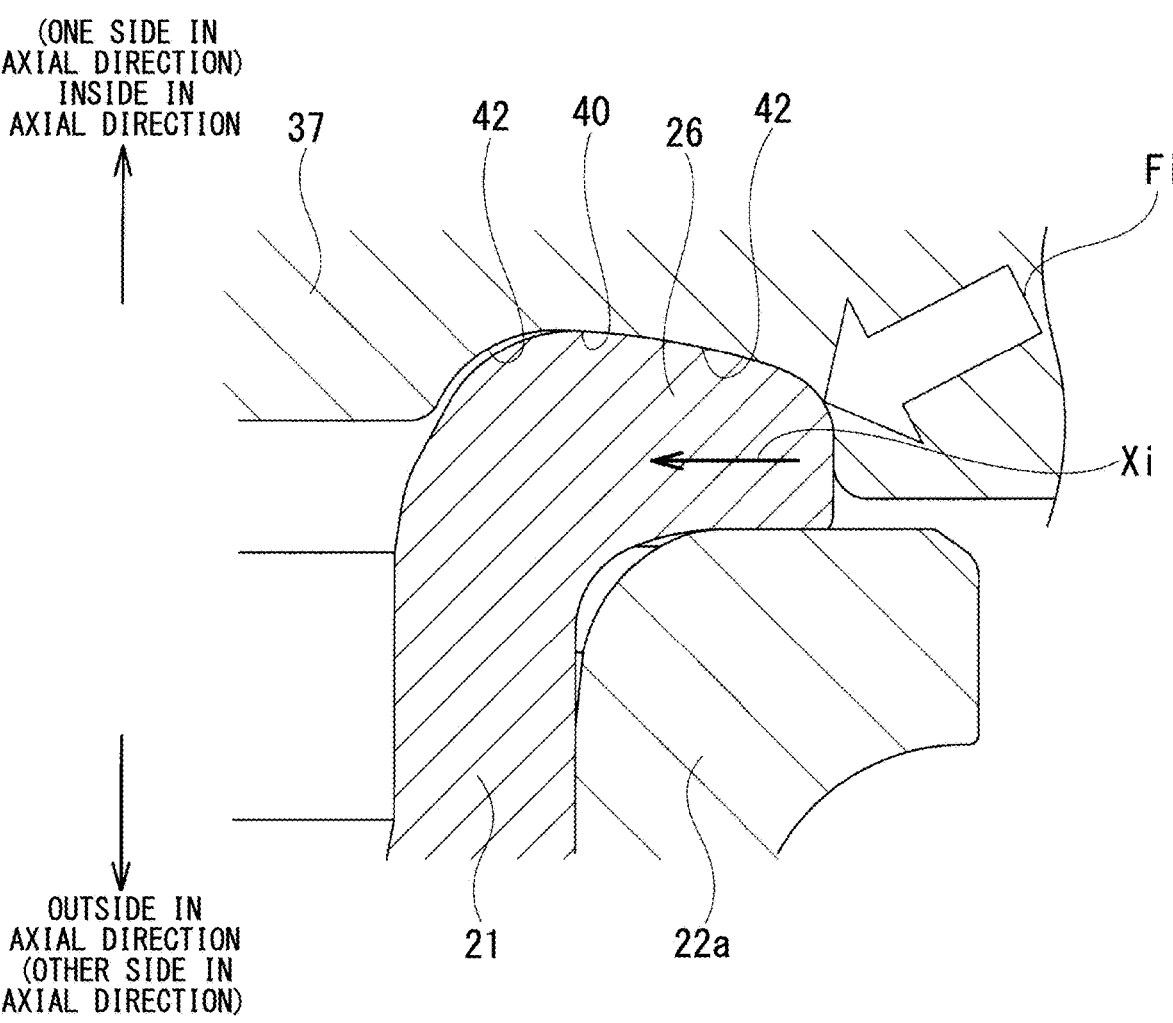

FIG. 10 is an enlarged view of a D part in FIG. 9(B).

Figure 11:
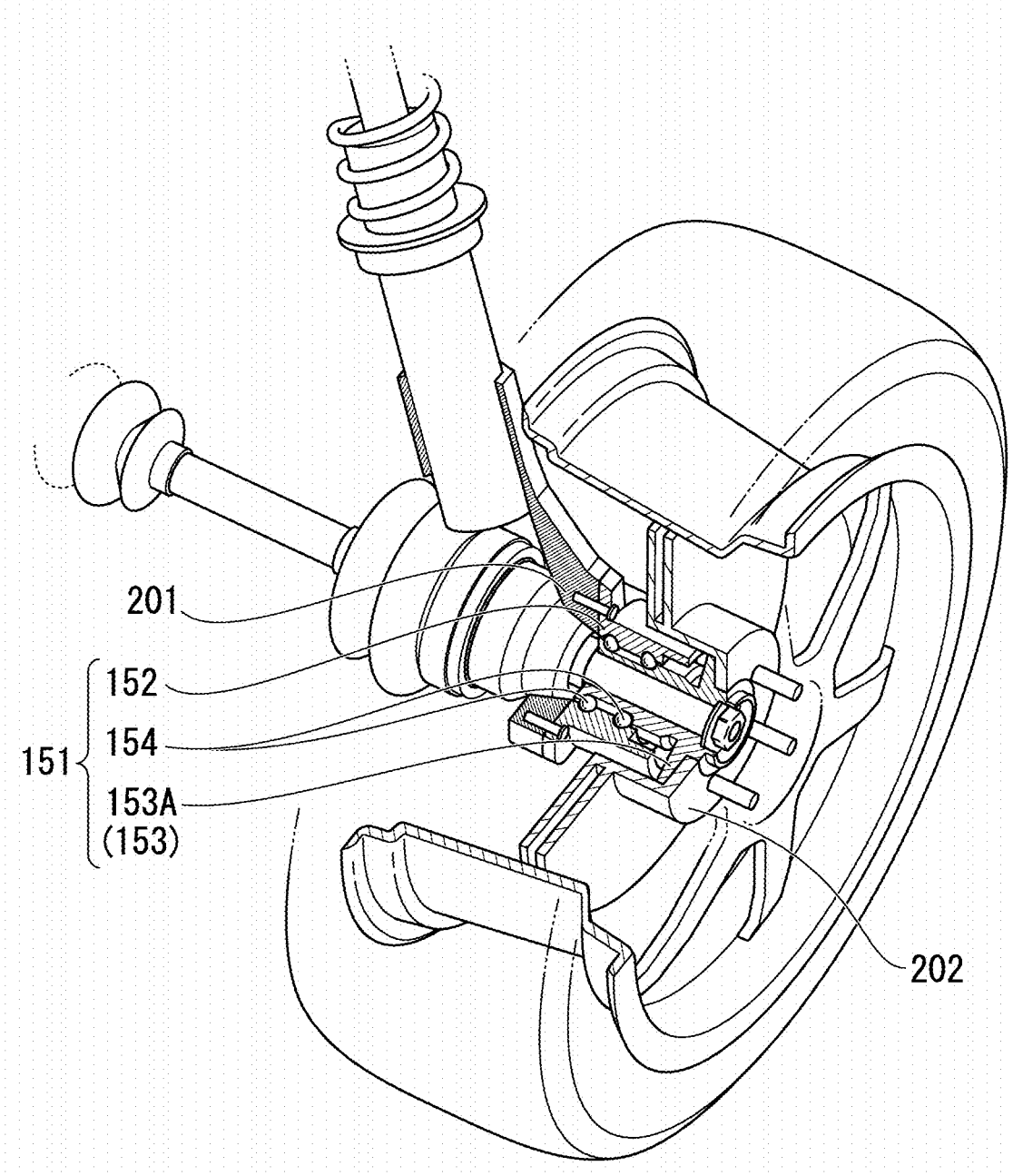

FIG. 11 is a partially schematic view of a vehicle including a hub unit bearing (bearing unit).

Figure 12:
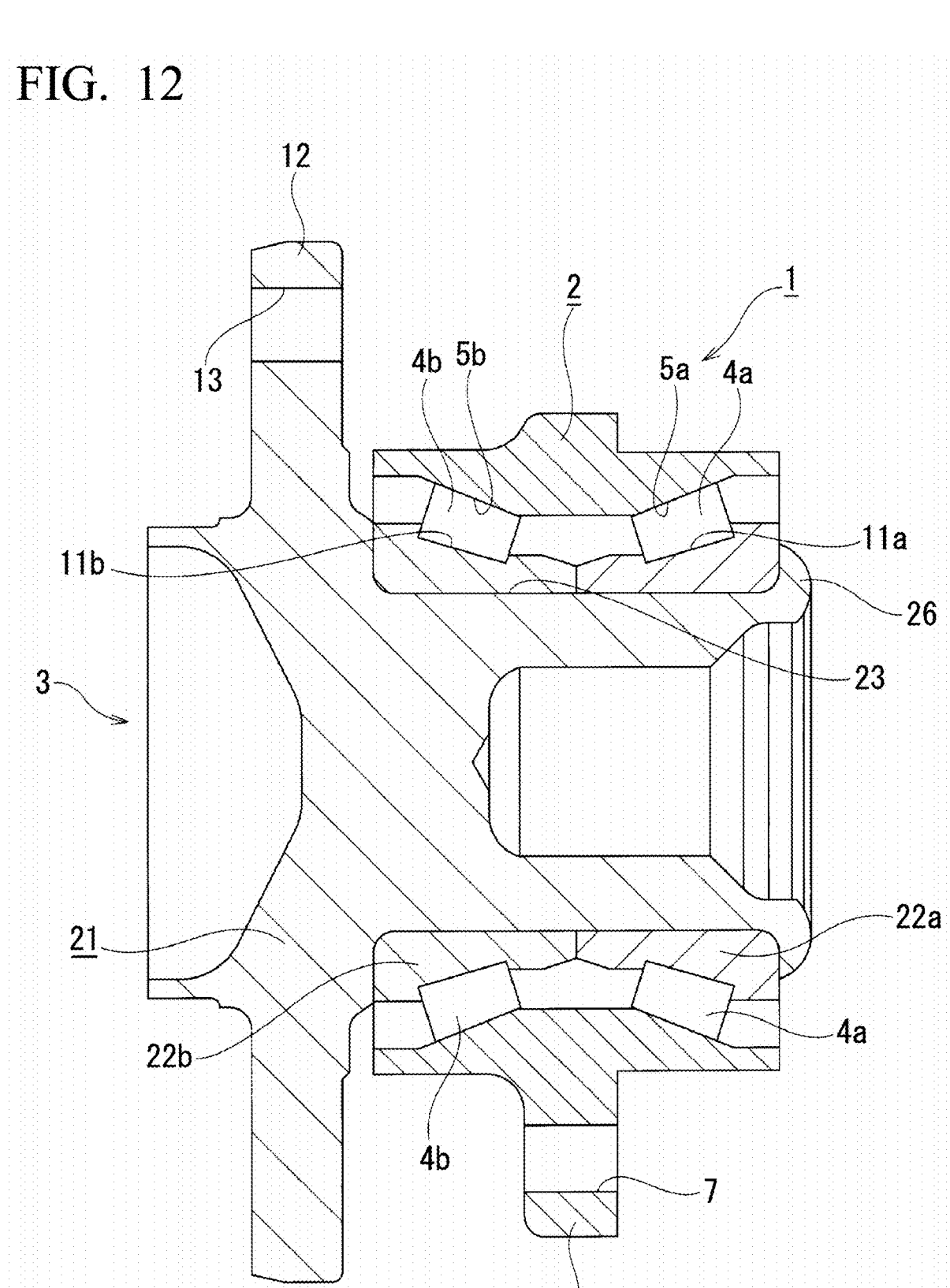

FIG. 12 is a cross-sectional view showing an example of a hub unit bearing using a tapered roller.

Figure 13:
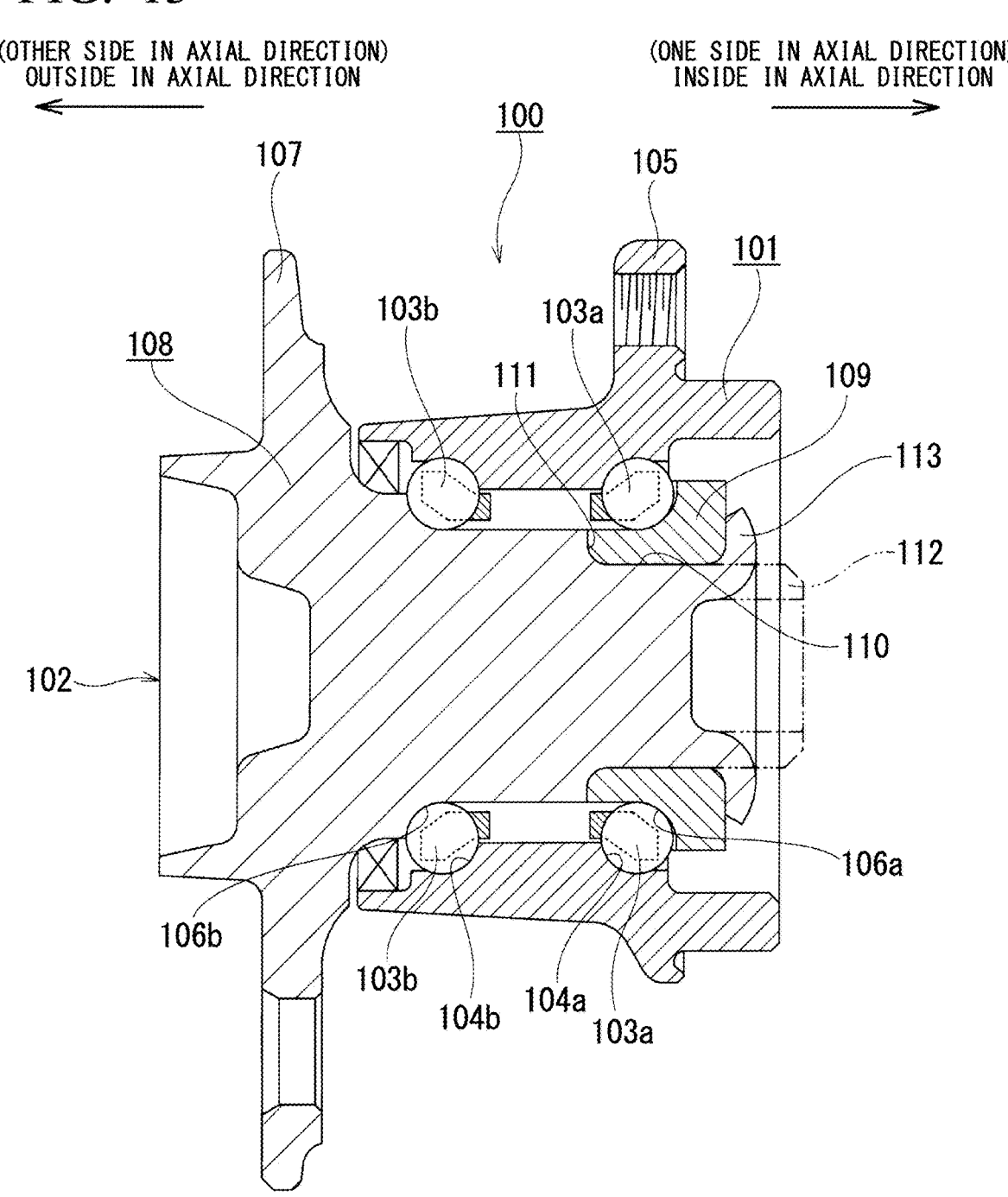

FIG. 13 is a cross-sectional view showing an example of a conventional hub unit bearing.

Figure 14:
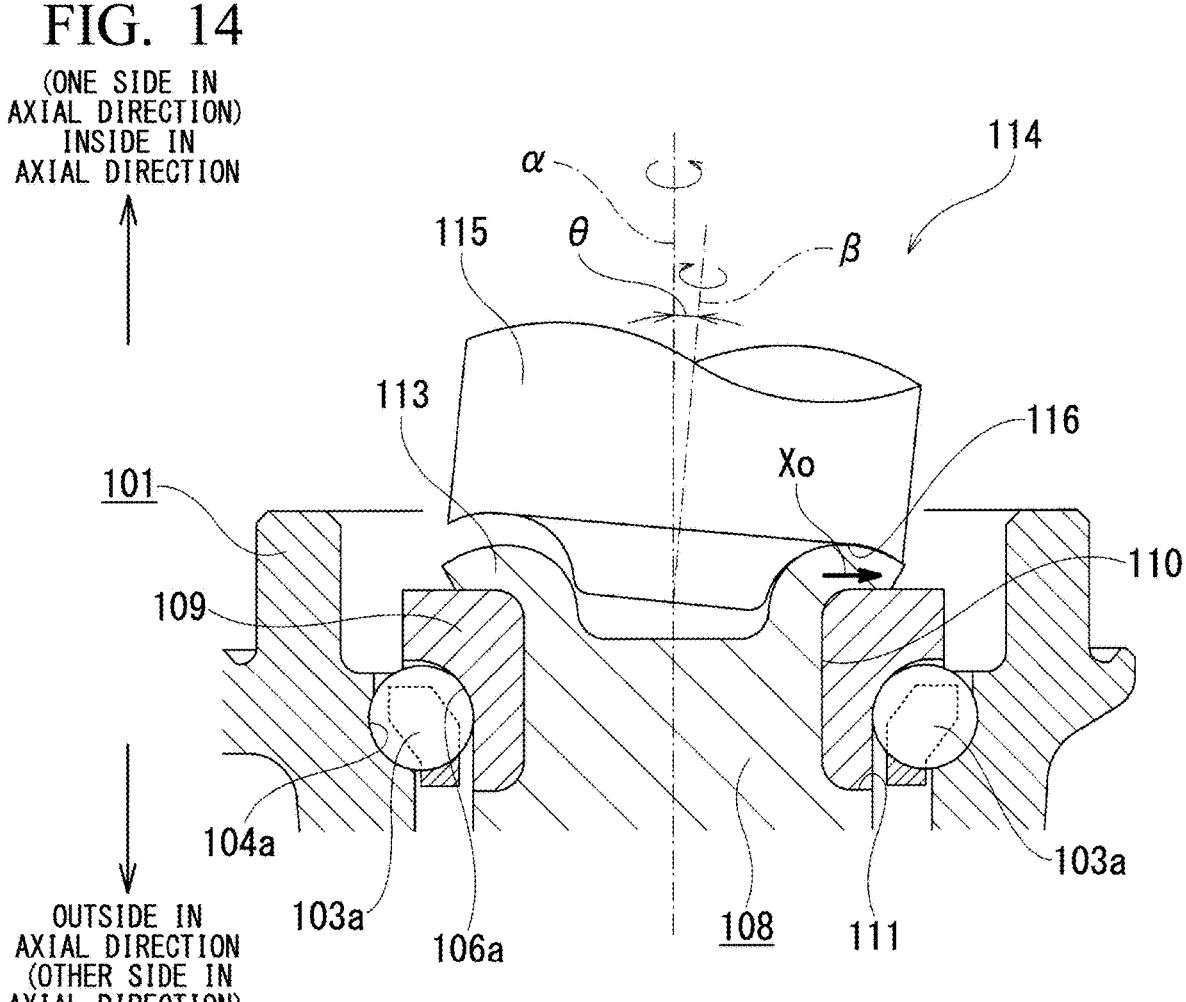

FIG. 14 is a partially cross-sectional view showing a state in which a staking portion is formed by a conventional method.

DESCRIPTION OF EMBODIMENTS

First Embodiment

An embodiment of the present invention will be described with reference to FIGS. 1 to 8.

(Configuration of Hub Unit Bearing 1)

Figure 1:
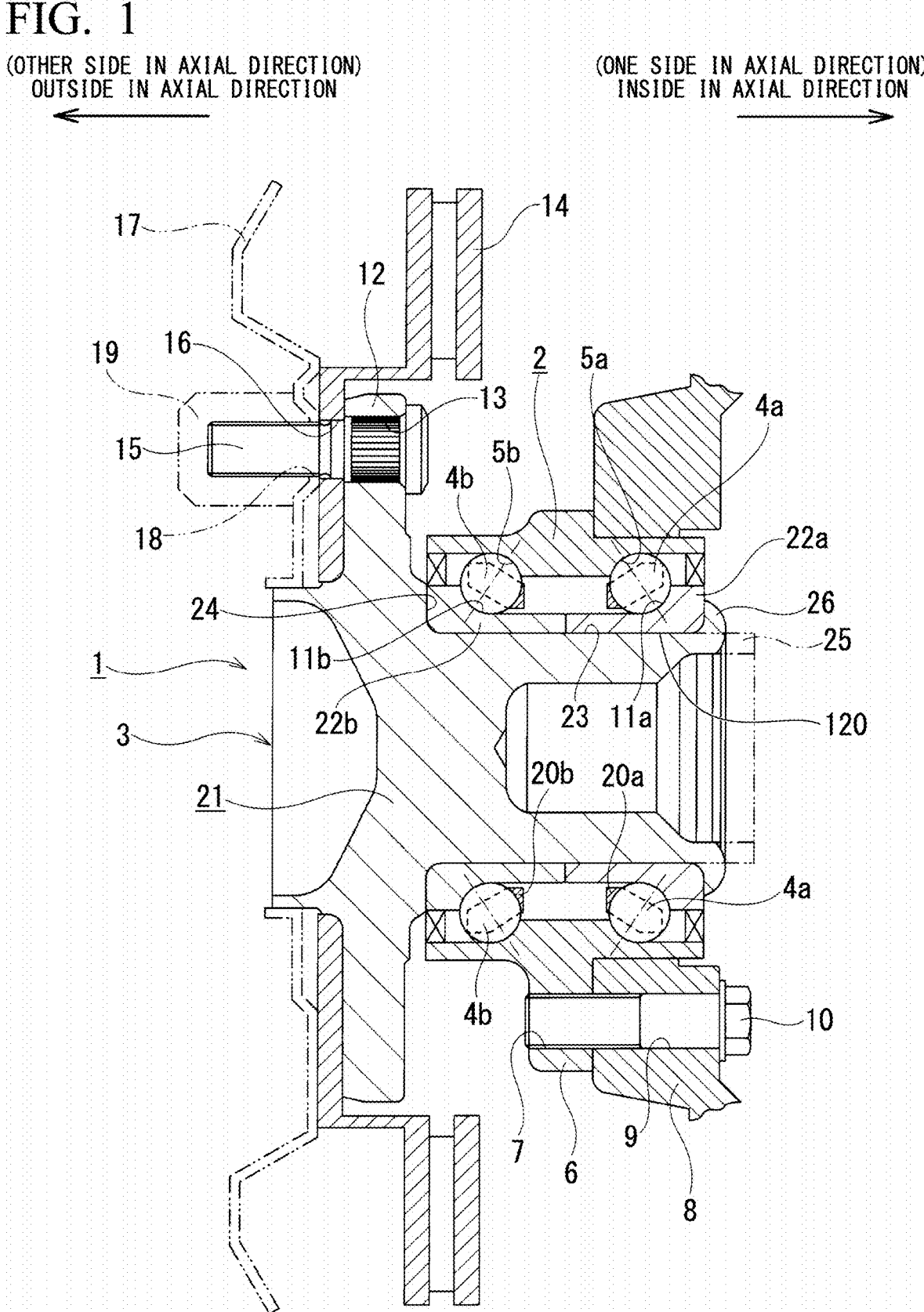
FIG. 1 is a cross-sectional view showing a state in which a hub unit bearing is assembled to a vehicle.

FIG. 1 shows a hub unit bearing 1 to be manufactured. The hub unit bearing (staking assembly, staking unit) 1 is for a driven wheel and includes an outer race 2, a hub 3, and a plurality of rolling elements 4a and 4b.

Regarding the hub unit bearing 1, the outside in the axial direction is the left side of FIG. 1 which is the outside in the width direction of the vehicle while the hub unit bearing is assembled to the vehicle. The inside in the axial direction is the right side of FIG. 1 which is the center side in the width direction of the vehicle while the hub unit bearing is assembled to the vehicle. In this example, regarding the hub unit bearing 1, the inside in the axial direction corresponds to one side in the axial direction and the outside in the axial direction corresponds to the other side in the axial direction.

The outer race 2 includes double-row outer race tracks 5a and 5b and a stationary flange 6. In an example, the outer races 5a and 5b are made of a hard metal such as medium carbon steel. In another example, the outer races 5a and 5b can be made of different materials. The double-row outer race tracks 5a and 5b are provided on the inner peripheral surface of the axially intermediate portion of the outer race 2 over the entire circumference. The stationary flange 6 protrudes radially outward from the axially intermediate portion of the outer race 2 and includes support holes 7 which are screw holes at a plurality of positions in the circumferential direction.

The outer race 2 is supported and fixed to a knuckle 8 in such a manner that a bolt 10 inserted through a passage hole 9 of the knuckle 8 constituting the suspension device of the vehicle is screwed and tightened into a support hole 7 of the stationary flange 6 from the inside in the axial direction.

The hub (staking assembly, staking unit) 3 is disposed on the radially inner side of the outer race 2 coaxially with the outer race 2. The hub 3 includes double-row inner race tracks 11a and 11b and a rotary flange 12. The double-row inner race tracks 11a and 11b are provided at portions facing the double-row outer race tracks 5a and 5b in the outer peripheral surface (outer surface) of the hub 3 over the entire circumference. The rotary flange 12 protrudes radially outward from a portion located on the axially outer side in relation to the outer race 2 in the hub 3 and includes attachment holes 13 provided at a plurality of positions in the circumferential direction.

In an example, a serration portion provided near a base end of a stud 15 is press-inserted into the attachment hole 13 in order to connect and fix a braking rotating body 14 such as a disc or a drum to the rotary flange 12. Further, the intermediate portion of the stud 15 is press-inserted into the passage hole 16 of the braking rotating body 14. Further, in order to fix a wheel 17 constituting a vehicle wheel to the rotary flange 12, a nut 19 is screwed and tightened to a male screw portion provided at the front end portion of the stud 15 while the male screw portion is inserted through a passage hole 18 of the wheel 17.

A plurality of the rolling elements 4a and 4b are arranged for each row between the double-row outer race tracks 5a and 5b and the double-row inner race tracks 11a and 11b. In an example, each of the rolling elements 4a and 4b is made of a hard metal such as bearing steel or ceramics. In another example, the rolling elements 4a and 4b can be made of different materials. The rolling elements 4a and 4b are rotatably held by cages 20a and 20b for each row. In the example of FIG. 1, balls are used as the rolling elements 4a and 4b, but tapered rollers (tapered hubs) are also used as shown in the example of FIG. 12 in some cases.

The hub (staking assembly, staking unit) 3 is composed of a hub main body (first member, hub race) 21, an internal inner race (second member) 22a, and an external inner race 22b. In an example, the hub main body 21 is made of a hard metal such as medium carbon steel. Each of the internal inner race 22a and the external inner race 22b is made of a hard metal such as bearing steel. In another example, the hub main body 21, the internal inner race 22a, and the external inner race 22b can be made of different materials. The hub (staking assembly) 3 substantially has a combination of the hub main body (first member) 21 and the inner races (second member) 22a and 22b in the axial direction. The hub 3 includes the hub main body 21 which includes an outer peripheral surface (outer surface) 23 and the inner races 22a and 22b which are arranged on the outer peripheral surface (outer surface) 23 of the hub main body 21 and are held by the hub main body 21. Additionally, the hub main body 21 corresponds to the first hub element (first member) and the internal inner race 22a corresponds to the second hub element (second member). The inner race track 11a on the inside in the axial direction is provided on the outer peripheral surface of the internal inner race 22a. The inner race track 11b on the outside in the axial direction is provided on the outer peripheral surface of the external inner race 22b. The rotary flange 12 is provided in the axially outer portion of the hub main body 21. The hub main body 21 includes a cylindrical fitting surface portion 23 which is provided on the outer peripheral surface of the axially intermediate portion. Further, the hub main body 21 includes a step surface 24 which is provided at the axially outer end portion of the fitting surface portion 23 to face the inside in the axial direction. The internal inner race 22a and the external inner race 22b are externally fitted to the fitting surface portion 23 of the hub main body 21 by tightening (press-fitting). Further, the hub main body 21 includes a staking portion 26 which is provided at the axially inner end portion. The staking portion 26 is bent radially outward from the axially inner end portion of the portion to which the internal inner race 22a is externally fitted in the hub main body 21 and suppresses the axially inner surface of the internal inner race 22a. That is, the internal inner race 22a and the external inner race 22b are connected and fixed to the hub main body 21 while being sandwiched between the staking portion 26 and the step surface 24 of the hub main body 21 in the axial direction. In this state, a preload is applied to the rolling elements 4a and 4b together with the contact angle of the back surface combination type. In an example, the hub main body 21 includes the staking portion 26 for the inner races 22a and 22b (the staking portion 26 for holding the inner races 22a and 22b). The hub main body 21 is inserted into holes 120 of the inner races 22a and 22b. The staking portion 26 which has a bend extending in the circumferential direction and covers the shaft end portion of the inner race 22a is provided in the peripheral wall of the hub main body 21.

Additionally, the staking portion 26 is formed by plastically deforming a cylindrical portion 25 extending axially inward from the axially inner end portion of the portion to which the internal inner race 22a is externally fitted in the hub main body 21 before forming the staking portion 26. In an embodiment, the hub main body 1 includes the staking portion 26 for the inner race 22a formed by deforming the shaft end of the hub main body 1 radially outward and the staking portion includes a radially outer portion having a deformed portion (processing mark) 130 (FIG. 7) at which a load was applied.

(Configuration of Staking Device 27)

Next, a staking device 27 which forms the staking portion 26 and connects and fixes the hub main body 21 to the internal inner race 22a and the external inner race 22b will be described with reference to FIGS. 2 to 4.

As shown in a schematic configuration of FIG. 2, the staking device 27 includes a frame 28, a work side device (first device) 29, and a tool side device (second device) 30.

The frame 28 includes a lower frame 31, an upper frame 32 which is disposed above the lower frame 31, and a plurality of columns 33 which support the upper frame 32 with respect to the lower frame 31.

A work side device 29 is supported by the lower frame 31. The work side device 29 includes a holder 34, an outer race support mechanism (not shown), a pressing mechanism (not shown), and a rotational drive mechanism (not shown).

The holder 34 can support the hub main body 21 constituting the hub unit bearing 1 assembled as below before forming the staking portion 26. Specifically, the holder 34 can support the axially outer portion (lower portion) of the hub 3 (hub main body 21) while the axially inner portion of the hub unit bearing 1 before forming the staking portion 26 is directed upward and the center axis of the hub 3 (the center axis of the hub main body 21) is aligned to the reference axis α in the up and down direction which is the own center axis.

The outer race support mechanism is a mechanism which non-rotatably supports the outer race 2 while the axially outer portion of the hub main body 21 constituting the hub unit bearing 1 is supported by the holder 34.

The pressing mechanism is, for example, a mechanism which uses a hydraulic pump as a drive source and moves the holder 34 and the outer race support mechanism in the axial direction (the up and down direction) of the reference axis α. Thus, the pressing mechanism can move the hub unit bearing 1 supported by the holder 34 and the outer race support mechanism in the axial direction (the up and down direction) of the reference axis α.

The rotational drive mechanism is, for example, a mechanism which uses an electric motor as a drive source and rotationally drives the holder 34 about the reference axis α. Thus, the rotational drive mechanism can rotationally drive the hub 3 supported by the holder 34 about the reference axis α.

A tool side device 30 is supported by the upper frame 32. The tool side device 30 includes a cylinder attached spindle 35 and a pressing die (molding die, staking die) 37.

The cylinder attached spindle 35 includes a hydraulic or pneumatic cylinder device 38 and a spindle 39. The cylinder device 38 rotatably supports the spindle 39 therein about the center axis β of the spindle 39. The cylinder device 38 can displace the spindle 39 in the axial direction of the center axis β. Such a cylinder attached spindle 35 is supported by the upper frame 32 while the center axis β of the spindle 39 is inclined with respect to the reference axis α by an angle θ. Additionally, a point P in part (A) of FIG. 2, part (A) and part (B) of FIG. 3, part (A) and part (B) of FIGS. 5, and 6 to be described later is an intersection between the reference axis α and the rotation axis β.

The pressing die 37 is fixed to the lower end portion which is the front end portion of the spindle 39 directly or through other members coaxially with the spindle 39. Thus, the pressing die 37 is supported by the cylinder device 38 to be rotatable about the own center axis (the center axis β of the spindle 39) through the spindle 39. Further, the cylinder device 38 can displace the pressing die 37 in the axial direction of the center axis β through the spindle 39. Additionally, in the following description, the center axis of the pressing die 37 is appropriately referred to as the rotation axis β (that is, the same symbol β as the center axis of the spindle 39 is used as the symbol of the rotation axis). The lower end surface which is the front end surface of the pressing die 37 is provided with a processing surface portion 40 which is formed by an inner surface of an annular concave portion centered on the rotation axis β.

(Method of Manufacturing Hub Unit Bearing 1)

Next, a method of forming the staking portion 26 using the staking device 27 at the time of manufacturing the hub unit bearing 1 will be described. A method of manufacturing the hub unit bearing 1 includes a step of combining the hub main body (first hub element) 21 and the inner races (second hub elements) 22a and 22b in the axial direction and a staking portion forming step of forming the staking portion 26 for the inner race 22a in the hub main body 21. In an embodiment, the staking portion forming step includes applying a load including a first load component directed inward in the radial direction to the radially outer portion of the hub main body 21 as will be described later.

The work of forming the staking portion 26 is performed in an assembly state (first assembly state) of the hub unit bearing 1 before forming the staking portion 26. Therefore, the hub unit bearing 1 before forming the staking portion 26 is assembled in advance.

The hub unit bearing 1 before forming the staking portion 26 can be assembled by an appropriate procedure, but can be assembled, for example, by the following procedure. First, the rolling element 4a of the inner row in the axial direction is disposed on the inner radial side of the outer race track 5a on the inside in the axial direction of the outer race 2 while being held by the cage 20a on the inside in the axial direction. At the same time, the rolling element 4b of the outer row in the axial direction is disposed on the inner radial side of the outer race track 5b on the outside in the axial direction of the outer race 2 while being held by the cage 20b on the outside in the axial direction. Next, the internal inner race 22a is inserted into the inner radial side of the outer race 2 from the inside in the axial direction. On the other hand, the external inner race 22b is inserted from the outside in the axial direction. Next, the internal inner race 22a and the external inner race 22b are externally fitted to the fitting surface portion 23 of the hub main body 21 before forming the staking portion 26 while mutually facing axial side surfaces are in contact with each other. On the other hand, the axially outer surface of the external inner race 22b is brought into contact with the step surface 24 of the hub main body 21. Accordingly, the hub unit bearing 1 before forming the staking portion 26 is assembled. Additionally, the assembly procedure can be appropriately changed.

When forming the staking portion 26 using the staking device 27, first, the hub unit bearing 1 before forming the staking portion 26 is set in the staking device 27. Specifically, as shown in FIG. 3(A), the axially inner portion of the hub unit bearing 1 before forming the staking portion 26 is directed upward and the center axis of the hub 3 (the center axis of the holder 34 constituting the staking device 27) is aligned to the reference axis α. In a state in which the axes are aligned to each other, the axially outer portion (lower portion) of the hub main body 21 is supported by the holder 34 (see part (A) and (B) of FIG. 2). Further, the outer race 2 is non-rotatably supported by the outer race support mechanism. Additionally, the hub unit bearing 1 is located below the position shown in FIG. 3(A) in the state before starting to process the staking portion 26 and the pressing die 37 does not come into contact with the cylindrical portion 25 of the hub main body 21.

If the hub unit bearing 1 before forming the staking portion 26 is set in the staking device 27 as described above, the work of forming the staking portion 26 is subsequently started. In this example, the work of forming the staking portion 26 is divided into a first step and a second step.

In the first step, the hub 3 is rotated about the reference axis α with respect to the outer race 2 based on the rotational driving of the holder 34 using the rotational drive mechanism of the work side device 29. Then, in this state, the hub unit bearing 1 is moved upward based on the upward moving of the holder 34 and the outer race support mechanism using the pressing mechanism of the work side device 29. Accordingly, as shown in FIG. 3(A), the hub 3 is rotated about the reference axis α with respect to the outer race 2 without rotating the pressing die 37 about the reference axis α while pressing a part in the circumferential direction of the cylindrical portion 25 by a part in the circumferential direction of the processing surface portion 40 in the pressing die 37. Then, the pressing die 37 is rotated about the rotation axis β based on the frictional force acting on the contact portion between the processing surface portion 40 and the cylindrical portion 25 in accordance with this operation. Accordingly, in a state in which a processing force Fo which is directed downward in the up and down direction and is directed radially outward is applied to a part in the circumferential direction of the cylindrical portion 25 from a part in the circumferential direction of the processing surface portion 40 of the pressing die 37, the application position of the processing force Fo is continuously changed in the circumferential direction of the cylindrical portion 25. A load including a load component directed radially outward is applied to the cylindrical portion 25 using the pressing die 37 and the load application position moves in the circumferential direction. Accordingly, as shown in part (A) and part (B) of FIG. 3, and FIG. 4, a staking portion intermediary body 41 is formed by plastically deforming the cylindrical portion 25 to be expanded radially outward while axially crushing the cylindrical portion.

In an example, as shown in FIG. 3(B) and FIG. 4, the staking portion intermediary body 41 is formed in a shape in which the axially outer surface of the staking portion intermediary body 41 slightly contacts the axially inner surface of the internal inner race 22a to a degree that the inner race track 11a on the inside in the axial direction is not deformed or the axially outer surface does not contact the axially inner surface of the internal inner race 22a. In other words, the staking portion intermediary body 41 is formed in a shape in which the preload of the hub unit bearing 1 does not change with the formation of the staking portion intermediary body 41. Additionally, in this example, as shown in FIG. 3(B) and FIG. 4, the processing surface portion 40 is in a state in which both the radially inner portion 42 and the radially outer portion 43 contact the staking portion intermediary body 41 at a portion in which the axially inner surfaces of the processing surface portion 40 and the staking portion intermediary body 41 contact each other. Here, the radially inner portion 42 of the processing surface portion 40 is a portion which is inclined in a direction moving away from the hub main body 21 (upward in FIG. 3(B) and FIG. 4) with respect to the axial direction of the reference axis α as it moves outward (rightward in FIG. 3(B) and FIG. 4) in the radial direction centered on the reference axis α. On the other hand, the radially outer portion 43 of the processing surface portion 40 is a portion which is inclined in a direction moving close to the hub main body 21 (downward in FIG. 3(B) and FIG. 4) with respect to the axial direction of the reference axis α as it moves outward in the radial direction centered on the reference axis α. In this example, the upward movement of the hub unit bearing 1 is temporarily stopped based on the fact that the upward movement of the holder 34 and the outer race support mechanism by the pressing mechanism of the work side device 29 is temporarily stopped at the time point of forming the staking portion intermediary body 41.

In an example, in order to form the staking portion intermediary body 41, a time point (timing) of stopping the upward movement of the hub unit bearing 1 is determined based on a drive torque Ts which is a torque for rotationally driving the holder 34 by the rotational drive mechanism (a torque for relatively rotating the pressing die 37 and the hub 3 about the reference axis α). This point will be described with reference to FIG. 8. Additionally, the drive torque Ts can be measured, for example, based on a current value of an electric motor which is a drive source of the rotational drive mechanism.

FIG. 8 is a diagram showing a time change of the drive torque Ts when processing the cylindrical portion 25 into the staking portion 26 without temporarily stopping the upward movement of the hub unit bearing 1. In this case, the drive torque Ts gradually increases in the time zone t1 after the start of processing, settles at a substantially constant value in the subsequent time zone t2, gradually decreases in the subsequent time zone t3, and settles at a substantially constant value again in the subsequent time zone t4.

The axially inner end portion (the cylindrical portion 25, the staking portion intermediary body 41, the staking portion 26) of the hub main body 21 which is processed by the processing surface portion 40 of the pressing die 37 does not contact the axially inner surface of the internal inner race 22a in the time zones t1 and t2. In the time zone t3, the axially inner end portion contacts the axially inner surface of the internal inner race 22a to a degree that the internal inner race 22a is not deformed in the diameter expansion direction (a degree that the inner race track 11a is not deformed axially inward). In the time zone t4, the internal inner race 22a is deformed in the diameter expansion direction. Additionally, the shape of the axially inner end portion of the hub main body 21 at this time is substantially the same (a shape curved like the staking portion 26 after completion) in each of the time zones t2, t3, and t4 when observing only the outer shape.

Here, in this example, the upward movement of the hub unit bearing 1 is temporarily stopped at the time point before entering the time zone t4 which is the time point before the deformation of the internal inner race 22a in the diameter expansion direction while confirming the drive torque Ts. Here, as the time point before entering the time zone t4, it is possible to adopt, for example, a time point immediately after shifting to the time zone t2, that is, a time point Q1 at which the drive torque Ts first begins to settle to a substantially constant value after the start of processing, or a time point immediately after shifting to the time zone t3, that is, a time point Q2 at which the drive torque Ts first begins to settle to a substantially constant value and then the drive torque Ts begins to decrease after the start of processing.

Then, in this example, the upward movement of the hub unit bearing 1 is temporarily stopped at a time point at which the above-described staking portion intermediary body 41 is formed. Then, the hub unit bearing 1 is slightly moved downward based on the downward movement of the holder 34 and the outer race support mechanism using the pressing mechanism of the work side device 29. Accordingly, as shown in part (B) of FIG. 3 to part (A) of FIG. 5, the processing surface portion 40 of the pressing die 37 and the staking portion intermediary body 41 are separated in the up and down direction and the first step is ended.

In the second step, in the state shown in FIG. 5(A), the pressing die 37 is displaced by a predetermined amount λ (for example, λ is about 0.1 mm to 5 mm) toward the hub 3 (the direction of the arrow S1) in the axial direction of the rotation axis β based on the axial displacement of the spindle 39 of the cylinder device 38. That is, as shown in FIG. 6 which is an enlarged view of a B part of FIG. 5(B), the front end position Z of the pressing die 37 is slightly displaced to the left in the drawing from the reference axis α.

Then, the hub unit bearing 1 is moved upward again based on the upward movement of the holder 34 and the outer race support mechanism using the pressing mechanism of the work side device 29 in this state. Accordingly, the hub 3 is rotated about the reference axis α with respect to the outer race 2 without rotating the pressing die 37 about the reference axis α while pressing a part of the processing surface portion 40 in the circumferential direction in the pressing die 37 against a part of the staking portion intermediary body 41 in the circumferential direction. A load including a load component directed radially inward is applied to the radially outer portion of the staking portion intermediary body 41 using the pressing die 37 and the application position of the load moves in the circumferential direction. Then, the pressing die 37 is rotated about the rotation axis β based on a frictional force acting on the contact portion between the processing surface portion 40 and the staking portion intermediary body 41 in accordance with this operation. Accordingly, the staking portion 26 is formed by plastically deforming the staking portion intermediary body 41 to be pressed radially inward while axially crushing the staking portion intermediary body as shown in part (A) and part (B) of FIG. 5, and FIG. 7.

Here, in this example, when the staking portion 26 is formed as shown in part (A) and part (B) of FIG. 5, and FIG. 7 by displacing the pressing die 37 by a predetermined amount in the direction of the arrow S1 as described above, in the processing surface portion 40, the radially inner portion 42 does not contact the staking portion intermediary body 41 (the staking portion 26) and only the radially outer portion 43 contacts the staking portion intermediary body 41 (the staking portion 26) at the contact portion between the processing surface portion 40 and the axially inner surface of the staking portion intermediary body 41 (the staking portion 26). Accordingly, a processing force Fi directed downward in the up and down direction and directed radially inward is applied from a part of the processing surface portion 40 in the circumferential direction to a part of the staking portion intermediary body 41 (the staking portion 26) in the circumferential direction. In other words, in this example, the amount in which the pressing die 37 is displaced in the direction of the arrow S1 as described above is regulated so that only the radially outer portion 43 in the processing surface portion 40 contacts the staking portion intermediary body 41 (the staking portion 26) at the contact portion between the processing surface portion 40 and the axially inner surface of the staking portion intermediary body 41 (the staking portion 26) when forming the staking portion 26 as shown in part (A) and part (B) of FIG. 5.

As described above, in this example, in the second step of the work of forming the staking portion 26, the processing force (the load including a component directed radially inward) Fi directed downward in the up and down direction and directed radially inward is applied from the radially outer portion 43 of the processing surface portion 40 to the staking portion 26. Therefore, in the second step, the thick portion of the staking portion 26 flows radially inward along the axially inner surface of the internal inner race 22a as indicated by an arrow Xi in FIG. 7. Additionally, in this example, since the radially inner portion 42 of the processing surface portion 40 does not contact the staking portion 26 and a slight gap exists between the radially inner portion 42 and the staking portion 26 at this time, the flow of the thick portion in the direction indicated by the arrow Xi is likely to occur based on the existence of the gap. Then, in this example, a force in the diameter contraction direction is applied to the axially inner surface of the internal inner race 22a due to the flow of the thick portion. Thus, in this example, it is possible to prevent or suppress the expansion of the internal inner race 22a in the diameter expansion direction in accordance with the formation of the staking portion 26. As a result, it is possible to prevent the breakage of the internal inner race 22a, suppress a variation in preload, or decrease the rotational friction of the hub 3 with respect to the outer race 2 in accordance with the formation of the staking portion 26. In this way, in this example, the step of forming the staking portion 26 includes the first step of deforming a part of the hub main body 21 radially outward by applying a load including a load component directed radially outward to the hub main body 21 using the pressing die 37 and the second step of applying a load including a load component directed radially inward to a radially outer portion of a deformed portion (staking portion intermediary body (intermediate staking portion) 41) of the hub main body 21 using the pressing die 37. In an example, at least one of the movements, positions, and postures of the pressing die 37 differs from each other between the first step and the second step. In an example, the staking portion intermediary body (intermediate staking portion) 41 is defined as the shaft end shape of the hub main body 21 that is at least partially deformed in the first step. Alternatively, the staking portion intermediary body (intermediate staking portion) 41 is defined as the shaft end shape of the hub main body 21 at the time point at which the control of the outer shape is completed in the second step. For example, the staking portion intermediary body (intermediate staking portion) 41 has a shaft end shape of the hub main body 21 at a time point at which the adjustment of the application of the load including the radially inward load component is completed. The adjusted load is constantly applied to the intermediate staking portion 41 so that the final staking portion 26 is formed. In an example, the staking portion intermediary body (intermediate staking portion) 41 substantially does not contact the inner race 22a. In another example, the staking portion intermediary body (intermediate staking portion) 41 substantially contacts the inner race 22a.

Alternatively and/or additionally, it is possible to measure the torque applied from the outer race 2 to the outer race support mechanism of the work side device 29 when the staking portion 26 is formed. Since the value of this torque becomes a degree corresponding to the preload of the hub unit bearing 1 increasing in accordance with the formation of the staking portion 26, it is possible to determine the time when ending the work of forming the staking portion 26 based on the torque measurement value.

In another example, it is possible to adopt a configuration of moving the pressing die 37 (and the cylinder attached spindle 35) in the axial direction of the reference axis α instead of moving the hub unit bearing 1 (and the holder 34) in the axial direction of the reference axis α as a configuration of relatively moving the pressing die 37 (and the cylinder attached spindle 35) and the hub unit bearing 1 (and the holder 34) in the axial direction of the reference axis α when forming the staking portion 26.

In a modified example, it is possible to adopt a configuration in which the pressing die 37 (and the spindle 39) can be rotationally driven about the rotation axis β using the rotational drive mechanism and the hub 3 (and the holder 34) is supported to be rotatable about the reference axis α. When such a configuration is adopted, the pressing die 37 is rotationally driven about the rotation axis β without rotating the pressing die 37 about the reference axis α while pressing a part of the processing surface portion 40 in the circumferential direction in the pressing die 37 against a part of the processing object (the cylindrical portion 25, the staking portion intermediary body 41) in the circumferential direction when forming the staking portion 26. Then, the hub 3 is rotated about the reference axis α based on a frictional force acting on the contact portion between the processing surface portion 40 and the processing object (the cylindrical portion 25, the staking portion intermediary body 41) in accordance with this operation. That is, in the above-described example, the processing object was processed by rotationally driving the hub 3 about the reference axis α while rotating the pressing die 37 about the rotation axis β in a following manner. In this example, it is possible to process the processing object by rotationally driving the pressing die 37 about the rotation axis β while rotating the hub 3 about the reference axis α in a following manner.

Second Embodiment

Another embodiment of the present invention will be described with reference to FIGS. 9 and 10.

In an embodiment, a device different from the staking device 27 shown in FIG. 2 is used as the staking device for performing the work of forming the staking portion 26. In an embodiment, the staking device is obtained by adding a mechanism that changes the inclination angle θ of the rotation axis β with respect to the reference axis α to the staking device 27 shown in FIG. 2. The mechanism that changes the inclination angle θ of the rotation axis β with respect to the reference axis α can be realized by, for example, an arc-shaped linear guide including an arc-shaped guide rail and a guide block moving along the guide rail. Specifically, the guide rail is fixed to the upper frame 32 and the guide block is fixed to the cylinder attached spindle 35 while the center of curvature of the arc-shaped guide rail is aligned to an intersection P between the reference axis α and the rotation axis β. When the cylinder attached spindle 35 and the pressing die 37 (rotation axis β) are swung about the intersection P by moving the guide block along the guide rail in this state, the inclination angle θ can be changed. Further, in an example, the mechanism that changes the inclination angle θ further includes an angle adjusting motor which is a drive source for swinging the cylinder attached spindle 35 and the pressing die 37 (rotation axis β) about the intersection P (adjusting the inclination angle θ). When carrying out the present invention, an appropriate mechanism different from the above one can be adopted as the mechanism that changes the inclination angle θ.

In an example, the first step of the work of forming the staking portion 26 is performed similarly to the case of the first example of the embodiment. In this example, a method of applying the processing force Fi directed downward in the up and down direction and directed radially inward from a part of the processing surface portion 40 in the circumferential direction to a part of the staking portion intermediary body 41 (the staking portion 26) in the circumferential direction in the second step of the work of forming the staking portion 26 is different from the case of the embodiment.

That is, in this example, in the second step, the inclination angle θ of the rotation axis β with respect to the reference axis α is first increased by a predetermined amount (for example, about 1° to 15°) by swinging the pressing die 37 about the intersection P between the reference axis α and the rotation axis β in the direction of the arrow S2 as shown in part (A) of FIG. 9 based on the driving of the angle adjusting motor. Accordingly, as shown in part (A) and part (B) of FIG. 9, and FIG. 10, when forming the staking portion 26 from the staking portion intermediary body 41, only the radially outer portion 43 in the processing surface portion 40 contacts the staking portion intermediary body 41 (the staking portion 26) in the contact portion between the processing surface portion 40 and the axially inner surface of the staking portion intermediary body 41 (the staking portion 26). Accordingly, the processing force Fi directed downward in the up and down direction and directed radially inward is applied from a part of the processing surface portion 40 in the circumferential direction to a part of the staking portion intermediary body 41 (the staking portion 26) in the circumferential direction. Other configurations and effects can be the same as in the above-described embodiment.

The present invention can be carried out by appropriately combining the configurations of the above-described embodiments as long as there is no contradiction.

Additionally, when carrying out the present invention, it is possible to use a staking device different from those of the above-described embodiments, that is, a staking device (swaging device) including a rotating head which can be rotationally driven about the reference axis α (see FIGS. 3, 5, and 9) and supports the pressing die 37 to be rotatable about the rotation axis β, when forming the staking portion 26. In such a swaging device, the pressing die 37 rotates (revolves) about the reference axis α as the rotating head rotates about the reference axis α. At this time, the pressing die 37 can rotate (revolve) about the rotation axis β. When the staking portion 26 is formed by using such a swaging device, the pressing die 37 is rotationally driven about the reference axis α together with the rotating head without rotating the hub 3 about the reference axis α while pressing a part of the processing surface portion 40 in the circumferential direction in the pressing die 37 against a part of the processing object (the cylindrical portion 25, the staking portion intermediary body 41) in the circumferential direction. The pressing die 37 rotates about the rotation axis β based on a frictional force acting on the contact portion between the processing surface portion 40 and the processing object (the cylindrical portion 25, the staking portion intermediary body 41). Accordingly, the application position of the processing force is continuously changed in the circumferential direction of the processing object (the cylindrical portion 25, the staking portion intermediary body 41) while applying the processing force to the processing object (the cylindrical portion 25, the staking portion intermediary body 41). Further, a mechanism that displaces the pressing die 37 in the axial direction of the rotation axis β or a mechanism that changes the inclination angle θ of the rotation axis β with respect to the reference axis α can be added to the above-described swaging device. When such a mechanism is added, the first step and the second step of the work of forming the staking portion 26 can be performed by using one swaging device as in the case of the above-described embodiments.

In an example, the staking portion 26 can be formed in the hub main body 21 by swaging. The staking portion forming step includes a first step of deforming a part of the hub main body 21 radially outward by applying a load including a load component (second load component) directed radially outward to the hub main body 21 using the pressing die 37 by swaging and a second step of applying a load including a load component (first load component) directed radially inward to a radially outer portion of a deformed portion (staking portion intermediary body (intermediate staking portion) 41) of the hub main body 21 using the pressing die 37 by swaging. In an example, at least one of swinging movements, positions (swing start position, swing end position), and postures (swing start posture, swing end posture) of the pressing die 37 differs from each other between the first step and the second step.

When carrying out the present invention, the first step (see FIG. 3) and the second step (see FIGS. 5 and 9) of the work of forming the staking portion can be respectively performed by using different (two) staking devices.

In this case, if the pressing dies having the same shape and size are used as the pressing dies of two staking devices, the manufacturing cost of the pressing die can be suppressed and thus the manufacturing cost of the hub unit bearing can be suppressed.

Further, in this case, in order to bring the preload applied to the rolling elements 4a and 4b closer to the target value, the axial load for forming the staking portion 26 in the second step can be determined by using the manufacturing information acquired in the first step or the manufacturing information acquired in the manufacturing process before the first step. For example, in the first step, information on the degree of processing resistance, in other words, the degree of hardness of the hub main body 21, when processing the cylindrical portion 25 into the staking portion intermediary body 41 is acquired. Then, in the second step, the axial load applied to the axially inner end portion of the hub main body 21 and required for bringing the preload closer to the target value can be determined by using the information. Further, for example, in the second step, the axial load applied to the axially inner end portion of the hub main body 21 and required for bringing the preload closer to the target value can be determined by using not only the information acquired in the first step but also the information acquired in the manufacturing process before the first step regarding factors that affect the preload such as the dimensions of specific parts. Further, in this case, for example, the axial load can be determined from the information by using the relational expression acquired by a statistical method such as multiple regression analysis.

FIG. 11 is a partially schematic view of a vehicle 200 including a hub unit bearing (bearing unit) 151. The present invention can be applied to both a hub unit bearing for a drive wheel and a hub unit bearing for a driven wheel. In FIG. 11, the hub unit bearing 151 is for a driven wheel and includes an outer race 152, a hub 153, and a plurality of rolling elements 156. The outer race 152 is fixed to a knuckle 201 of a suspension device by using a bolt and the like. A vehicle wheel (and braking rotating body 22) 202 is fixed to a flange (rotary flange) 153A provided in the hub 153 by using a bolt and the like. Further, the vehicle 200 can have the above-described support structure for the hub unit bearing 151 used for a driven wheel.

The present invention is not limited to the hub of the hub unit bearing, but can also be applied to other staking assemblies (staking units) in which a first member is axially combined with a second member having a hole into which the first member is inserted.

REFERENCE SIGNS LIST

1 Hub unit bearing
2 Outer race
3 Hub
4a, 4b Rolling element
5a, 5b Outer race track
6 Stationary flange
7 Support hole
8 Knuckle
9 Passage hole
10 Bolt
11a, 11b Inner race track
12 Rotary flange
13 Attachment hole
14 Braking rotating body
15 Stud
16 Passage hole
17 Wheel
18 Passage hole
19 Nut
20a, 20b Cage
21 Hub main body (hub race, first member)
22a Inner race (internal inner race, second member)
22b Inner race (external inner race, second member)
23 Fitting surface portion
24 Step surface
25 Cylindrical portion
26 Staking portion
27 Staking device
28 Frame
29 Work side device
30 Tool side device
31 Lower frame
32 Upper frame
33 Column
34 Holder
35 Cylinder attached spindle
37 Pressing die
38 Cylinder device
39 Spindle
40 Processing surface portion
41 Staking portion intermediary body
42 Radially inner portion
43 Radially outer portion
100 Hub unit bearing
101 Outer race
102 Hub
103a, 103b Rolling element
104a, 104b Outer race track
105 Stationary flange
106a, 106b Inner race track
107 Rotary flange
108 Hub main body (hub race)
109 Internal inner race
110 Fitting surface portion
111 Step surface
112 Cylindrical portion
113 Staking portion
114 Staking device
115 Pressing die
116 Processing surface portion

The invention claimed is:

1. A staking device comprising:

a reference axis;

a holder that supports a workpiece along the reference axis;

a pressing die that has a center axis and a processing surface portion, the pressing die being arranged such that the center axis of the pressing die is inclined with respect to the reference axis, the processing surface portion of the pressing die having a first processing surface portion and a second processing surface portion, the second processing surface portion being located radially outward with respect to the first processing surface portion;

a first mechanism that has a first motor to execute a relative rotational movement between the workpiece and the pressing die while the center axis of the pressing die is inclined with respect to the reference axis; and a second mechanism that has a second motor, a guide rail and a guide block to change an inclination angle of the center axis of the pressing die with respect to the reference axis, the second motor being different from the first motor.

2. The staking device according to claim 1, wherein the first mechanism is further configured to execute a rotational movement with which the pressing die is rotatable rotates around the center axis.

3. The staking device according to claim 1, wherein a part of the second processing surface portion is facing radially inward and is arranged nearer to the holder than an other part of the second processing surface portion.

4. A vehicle manufacturing system comprising:

the staking device of claim 1; and a vehicle body to which a hub unit bearing manufactured by use of the staking device is assembled.

* * * * *